(12) United States Patent
Xu et al.

(10) Patent No.: US 12,008,739 B2
(45) Date of Patent: Jun. 11, 2024

(54) AUTOMATIC PHOTO EDITING VIA LINGUISTIC REQUEST

(71) Applicant: ADOBE INC., San Jose, CA (US)

(72) Inventors: Ning Xu, Milpitas, CA (US); Zhe Lin, Clyde Hill, WA (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 323 days.

(21) Appl. No.: 17/452,529

(22) Filed: Oct. 27, 2021

(65) Prior Publication Data

US 2023/0126177 A1 Apr. 27, 2023

(51) Int. Cl.
| | | |
|---|---|---|
| *G06T 5/90* | (2024.01) | |
| *G06N 3/08* | (2023.01) | |
| *G06T 5/50* | (2006.01) | |
| *G06T 5/77* | (2024.01) | |
| *G06T 11/60* | (2006.01) | |
| *G10L 15/22* | (2006.01) | |

(52) U.S. Cl.
CPC .............. *G06T 5/77* (2024.01); *G06N 3/08* (2013.01); *G06T 5/50* (2013.01); *G06T 5/90* (2024.01); *G06T 11/60* (2013.01); *G10L 15/22* (2013.01); *G06T 2207/20081* (2013.01); *G10L 2015/223* (2013.01)

(58) Field of Classification Search
CPC .................................................... G06T 5/005
See application file for complete search history.

(56) References Cited

U.S. PATENT DOCUMENTS

| | | | |
|---|---|---|---|
| 2021/0216862 A1* | 7/2021 | Liu | ............... G06N 3/08 |
| 2022/0237838 A1* | 7/2022 | Liu | ............. G06N 3/063 |
| 2023/0342890 A1* | 10/2023 | Kanazawa | ............ G06T 5/77 |

FOREIGN PATENT DOCUMENTS

WO WO-2022075772 A1 * 4/2022 ............. G06T 5/005

OTHER PUBLICATIONS

Banerjee, et al. "METEOR: An Automatic Metric for MT Evaluation with Improved Correlation with Human Judgments", In Proceedings of the ACL Workshop on Intrinsic and Extrinsic Evaluation Measures for Machine Translation and/or Summarization, pp. 65-72, 2005.
Bychkovsky, et al., "Learning Photographic Global Tonal Adjustment with a Database of Input / Output Image Pairs", In The Twenty-Fourth IEEE Conference on Computer Vision and Pattern Recognition, 2011, pp. 97-104.
Dong, et al., "Semantic Image Synthesis via Adversarial Learning", In Proceedings of the IEEE International Conference on Computer Vision, pp. 5706-5714, 2017.

(Continued)

*Primary Examiner* — Oneal R Mistry
(74) *Attorney, Agent, or Firm* — F. CHAU & ASSOCIATES, LLC

(57) ABSTRACT

The present disclosure relates to systems and methods for automatically processing images based on a user request. In some examples, a request is divided into a retouching command (e.g., a global edit) and an inpainting command (e.g., a local edit). A retouching mask and an inpainting mask are generated to indicate areas where the edits will be applied. A photo-request attention and a multi-modal modulation process are applied to features representing the image, and a modified image that incorporates the user's request is generated using the modified features.

20 Claims, 15 Drawing Sheets

(56) References Cited

OTHER PUBLICATIONS

El-Nouby, et al., "Tell, Draw, and Repeat: Generating and Modifying Images Based on Continual Linguistic Instruction", In Proceedings of the IEEE International Conference on Computer Vision, pp. 10304-10312, 2019.
Gao, et al., "AdversarialNAS: Adversarial Neural Architecture Search for GANs", In Proceedings of the IEEE/CVF Conference on Computer Vision and Pattern Recognition, pp. 5680-5689, 2020.
Goodfellow, et al., "Generative Adversarial Nets", In Advances in neural information processing systems, pp. 2672-2680, 2014.
Hu, et al., "Exposure: A White-Box Photo Post-Processing Framework", ACM Transactions on Graphics (TOG), 37 (2): 1-17, arXiv preprint arXiv: 1709.09602v2 [cs.GR] Feb. 6, 2018.
Isola, et al., "Image-to-Image Translation with Conditional Adversarial Networks", In Proceedings of the IEEE conference on computer vision and pattern recognition, pp. 1125-1134, 2017.
Laput, et al., "PixelTone: A Multimodal Interface for Image Editing", In Proceedings of the SIGCHI Conference on Human Factors in Computing Systems, pp. 2185-2194, 2013.
Li, et al., "ManiGAN: Text-Guided Image Manipulation", In Proceedings of the IEEE/CVF Conference on Computer Vision and Pattern Recognition, pp. 7880-7889, 2020.
Li, et al., "Object-driven Text-to-Image Synthesis via Adversarial Training", In Proceedings of the IEEE Conference on Computer Vision and Pattern Recognition, pp. 12174-12182, 2019.
Lin, "ROUGE: A Package for Automatic Evaluation of Summaries", In Text summarization branches out, pp. 74-81, 2004.
Mirza, et al. "Conditional Generative Adversarial Nets", arXiv preprint arXiv:1411.1784v1 [cs.LG] Nov. 4, 2014, 7 pages.
Nam, et al., "Text-Adaptive Generative Adversarial Networks: Manipulating Images with Natural Language", In Advances in neural information processing systems, pp. 42-51, arXiv preprint arXiv:1810.11919v2 [cs.CV] Nov. 28, 2018.
Papineni, et al., "BLEU: a Method for Automatic Evaluation of Machine Translation", In Proceedings of the 40th Annual Meeting of the Association for Computational Linguistics, pp. 311-318, 2002.
Park, et al., "Distort-and-Recover: Color Enhancement using Deep Reinforcement Learning", In Proceedings of the IEEE Conference on Computer Vision and Pattern Recognition, pp. 5928-5936, 2018.
Park, et al., "Semantic Image Synthesis with Spatially-Adaptive Normalization", In Proceedings of the IEEE Conference on Computer Vision and Pattern Recognition, pp. 2337-2346, arXiv preprint arXiv: 1903.07291v2 [cs.CV] Nov. 5, 2019.
Reed, et al., "Generative Adversarial Text to Image Synthesis", Proceedings of the 33rd International Conference on Machine Learning, 2016, 10 pages.
Shi, et al., "A Benchmark and Baseline for Language-Driven Image Editing", Computer Vision Foundation, 2020, 16 pages.
Tan, et al., "Expressing Visual Relationships via Language", In Proceedings of the 57th Annual Meeting of the Association for Computational Linguistics, pp. 1873-1883, 2019.
Vedantam, et al., "CIDEr: Consensus-based Image Description Evaluation", In Proceedings of the IEEE conference on computer vision and pattern recognition, pp. 4566-4575, 2015.
Wang, et al., "Learning to Globally Edit Images with Textual Description", arXiv preprint arXiv:1810.05786v1 [cs.CV] Oct. 13, 2018, 21 pages.
Xu, et al., "AttnGAN: Fine-Grained Text to Image Generation with Attentional Generative Adversarial Networks", In Proceedings of the IEEE conference on computer vision and pattern recognition, pp. 1316-1324, 2018.
Yu, et al., "Generative Image Inpainting with Contextual Attention", In Proceedings of the IEEE conference on computer vision and pattern recognition, pp. 5505-5514, 2018.
Yu, et al., "Free-Form Image Inpainting with Gated Convolution", In Proceedings of the IEEE International Conference on Computer Vision, pp. 4471-4480, 2019.
Yu, et al., "MAttNet: Modular Attention Network for Referring Expression Comprehension", In Proceedings of the IEEE Conference on Computer Vision and Pattern Recognition, pp. 1307-1315, 2018.
Zhang, et al., "StackGAN: Text to Photo-realistic Image Synthesis with Stacked Generative Adversarial Networks", In Proceedings of the IEEE international conference on computer vision, pp. 5907-5915, 2017.
Zhang, et al., "StackGAN++: Realistic Image Synthesis with Stacked Generative Adversarial Networks", IEEE transactions on pattern analysis and machine intelligence, 41(8):1947-1962, arXiv preprint arXiv:1710.10916v3 [cs.CV] Jun. 28, 2018.
Zhu, et al., "Unpaired Image-to-Image Translation using Cycle-Consistent Adversarial Networks", In Proceedings of the IEEE international conference on computer vision, pp. 2223-2232, 2017.
Zhu, et al., "Progressive Pose Attention Transfer for Person Image Generation", In Proceedings of the IEEE Conference on Computer Vision and Pattern Recognition, pp. 2347-2356, 2019.

\* cited by examiner

AUTOMATIC PHOTO EDITING VIA LINGUISTIC REQUEST

BACKGROUND

The following relates generally to image processing, and more specifically to automated image processing using machine learning.

Digital image processing refers to the use of a computer to edit a digital image using an algorithm or a processing network. For example, digital image processing may be performed on images taken by a novice photographer to enhance the general appeal of the image. In some cases, an image may be processed increase image clarity. For example, digital images may include regions of darkness, undesired color tones or objects.

However, editing these attributes can be difficult and time consuming, even using advance image editing software. Additionally, conventional image editing systems are not capable of natural language request-based image editing. Therefore, there is a need in the art for improved image processing systems and methods to automatically edit an image based on a user request.

SUMMARY

Embodiments of the present disclosure relate to systems and methods for automatically processing images based on a user request. In some examples, a request is divided into a retouching command (e.g., a global edit) and an inpainting command (e.g., a local edit). A retouching mask and an inpainting mask are generated to indicate areas where the edits will be applied. A photo-request attention and a multi-modal modulation process are applied to features representing the image, and a modified image that incorporates the user's request is generated using the modified features.

A method, apparatus, non-transitory computer readable medium, and system for image processing are described. One or more aspects of the method, apparatus, non-transitory computer readable medium, and system include identifying an image and an edit command for the image; encoding the edit command to obtain an inpainting vector and a retouching vector; generating an inpainting mask based on the inpainting vector and a retouching mask based on the retouching vector; generating an image feature representation based on the image and the inpainting mask; generating a modified image feature representation based on the image feature representation, the retouching mask, and an attention matrix calculated using the retouching vector; and generating a modified image based on the modified image feature representation, wherein the modified image represents an application of the edit command to the image.

A method, apparatus, non-transitory computer readable medium, and system for training a neural network for image processing are described. One or more aspects of the method, apparatus, non-transitory computer readable medium, and system include receiving training data comprising a training image, an edit command, and a ground truth image representing an application of the edit command to the training image; encoding the edit command to obtain an inpainting vector and a retouching vector; generating an inpainting mask based on the inpainting vector and a retouching mask based on the retouching vector; generating an image feature representation based on the training image and the inpainting mask; generating a modified image feature representation based on the image feature representation, the retouching mask, and an attention matrix calculated using the retouching vector; generating a modified image based on the modified image feature representation, wherein the modified image represents an application of the edit command to the training image; calculating a loss function based on the modified image and the ground truth image; and training a neural network based on the loss function.

An apparatus, system, and method for image processing are described. One or more aspects of the apparatus, system, and method include a text encoder configured to encode an edit command for an image to obtain an inpainting vector and a retouching vector; a phrase conditioned grounding (PCG) network configured to generate an inpainting mask based on the inpainting vector and a retouching mask based on the retouching vector; an image encoder configured to generate an image feature representation based on the image and the inpainting mask; a multi-modal modulation network configured to generate a modified image feature representation based on the image feature representation, the retouching mask, and an attention matrix calculated using the retouching vector; and a decoder configured to generate a modified image based on the modified image feature representation, wherein the modified image represents an application of the edit command to the image.

DETAILED DESCRIPTION

Figure 1:
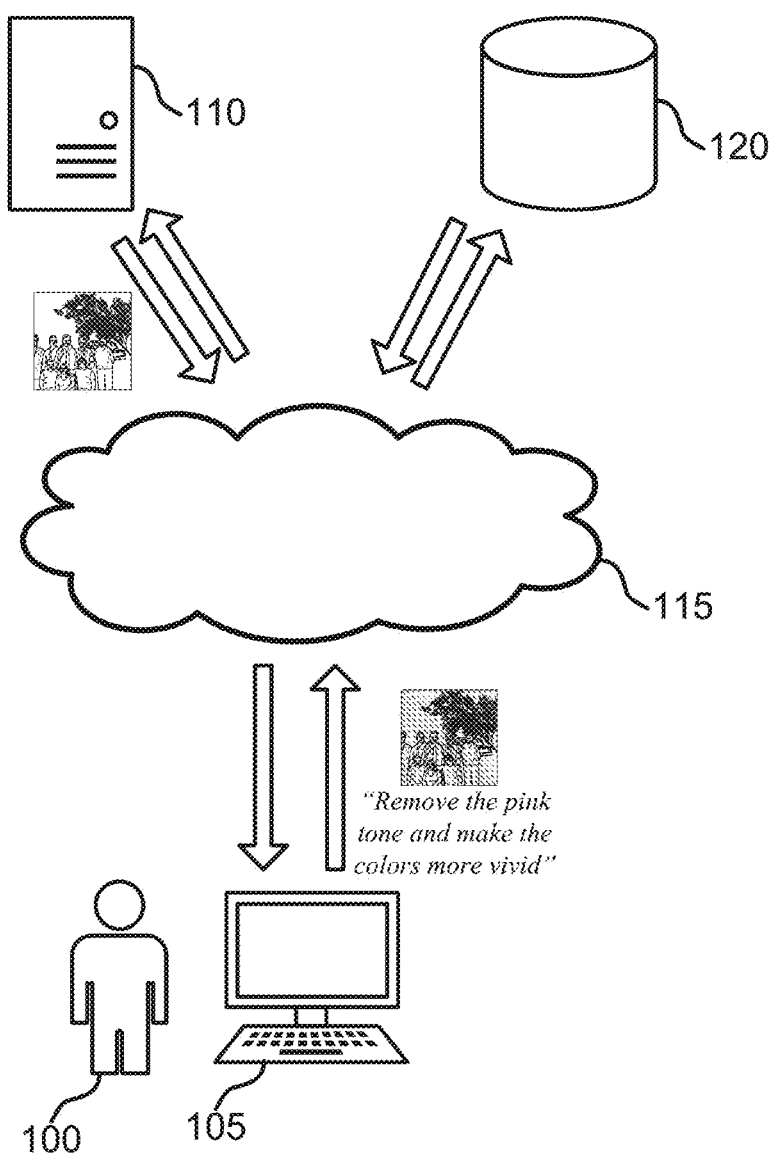
FIG. 1 shows an example of an image editing system according to aspects of the present disclosure.

The present disclosure describes systems and methods for image processing, and particularly, to editing image based on linguistic commands. According to some embodiments, an editing request is divided into a retouching command (e.g., a global edit) and an inpainting command (e.g., a local edit). A retouching mask and an inpainting mask are generated to indicate areas where the edits will be applied. In some embodiments, the inpainting mask is applied prior to encoding the image as a set of image features. Then, a photo-request attention process adaptively embeds the retouching command and visual features in the same space to determine how much of the edit should be applied at different locations. A multi-modal modulation process transforms the retouching command into modulation parameters used to modify the image features. Then, the modified features are decoded to produce an image that incorporates the original editing request.

Image editing may include various sub-tasks, including inpainting and retouching. Inpainting refers to modification of a particular object in an image, e.g., adding or removing an object. Retouching refers to editing global features of an image. However, in some cases it is desirable to apply retouching commands differently at different parts of the image. Retouching commands can include operations such as changing brightness, color, or contrast.

Conventional image editing systems are unable to effectively apply unconstrained image editing commands such as a command that does not specify which areas of an image to apply a command to. Furthermore, these systems cannot process requests that incorporate both inpainting and retouching commands. For example, deep neural networks such as generative adversarial networks (GANs) can be trained to perform a limited set of pre-defined operations. These networks can use reinforcement learning to learn optimal parameters for each operation. However, such systems are limited in use of linguistic requests and are not able to edit images when the request is not clearly mapped to the pre-defined operations. Furthermore, existing networks are not able to extract the relevant editing requests from a natural language request. As a result, the operation of these networks may be limited to the application of a limited set of operations that include detailed descriptions of the target image. As a result, existing methods have low effectiveness in real-world applications.

Embodiments of the present disclosure include an image editing system that detects both inpainting and retouching commands in a natural language request. In some embodiments, a bidirectional attention-based model is used to extract linguistic features from the user request. The linguistic features can be used to generate image masks corresponding to the inpainting and retouching elements. The inpainting mask can be applied prior to encoding the image features. Then, the retouching command is applied based on the retouching mask using a photo request attention algorithm and a multi-modal modulation network. As a result, an image editing system described by the present disclosure can edit real-world images based on commands that are both vague (i.e., they don't specify which portions of the image to retouch) and complex (i.e., they include both inpainting and retouching elements).

Some embodiments of the present disclosure can be implemented in the context of image editing. FIGS. 1-4 provide an example of an image editing system and how such a system can be applied to edit images. FIGS. 5-8 describe an example system architecture. FIGS. 9-13 provide examples of image processing methods, and FIGS. 14 and 15 describe methods for training a neural network for performing image processing.

Image Editing

FIG. 1 shows an example of an image editing system according to aspects of the present disclosure. The example shown includes user 100, user device 105, image editing apparatus 110, cloud 115, and database 120. In some embodiments, user 100 may provide an image and an image editing request to the image editing apparatus 110 via the cloud 115 in order to perform an image editing operation. In some embodiments, the user device 105 may include image editing software incorporates elements of the image editing apparatus 110. In some cases, the image is stored and retrieved from database 120.

In the example illustrated, the user 100 provides an image that includes several people, and also provides a request to "remove the pink tone and make the colors more vivid." The image editing apparatus 110 can receive the image and the user request and automatically perform operations to execute the request.

Image editing has a range of applications, for example, removing pedestrians passing by in wedding photos, or retouching outdoor images that have been overexposed or underexposed. In some cases, photo editing software (e.g., Adobe Photoshop®) can be used to make these edits. However, it can be difficult or impossible for a beginner to perform complicated edits due to the time involved in learning the editing processes.

Conventional approaches for automatic image editing are restricted to simple requests and a limited number of operations use predefined global operations. However, in practical applications, user requests can be both complicated and vague. For example, a request can be complicated in that it can indicate multiple commands, including both inpainting and retouching commands. The requests can be vague in that they may not provide details about the operation to be performed or the region to be edited.

Thus, existing methods can apply operations in an inappropriate manner. For example, consider an input image with a dark background, bright foreground and a vague user request (i.e., brighten the image). In such a case, brightening the background more and the foreground less will increase image clarity. Applying the same edit equally to all regions can produce undesirable results. Furthermore, conventional editing tools are not able to work on requests which may not be represented by the predefined operations (e.g., remove pink tone from the image). The low number of pre-defined operations that conventional systems are capable of employing do cover the scope of real-world operations that a user might desire to apply on the target image.

Embodiments of the present disclosure include image editing tools that can edit images automatically using text-based requests without complex training. Embodiments can adaptively edit photos using unconstrained linguistic requests. In some cases, a photo-request attention (PRA) adaptively edits the input image in different spatial locations. The PRA calculates the attention between embeddings of linguistic requests and patches on visual feature maps. In some examples, the PRA can learn to assign an appropriate weight for each location using ground truth target images which have been manually retouched. For example, a very light place in an image may receive a low attention degree when the request is to brighten the image since the real intention is likely to only brighten the dark places in the image.

Additionally, a multi-modal modulation network directly embeds linguistic request into the conditional signal for a GAN to remove the constraint of relying on a set of pre-defined operations. The multi-modal modulation network bridges the language space and vision space for conditional image synthesis by producing two modulation parameters from the language embeddings for a retouching request. The modulation parameters are then used to achieve editing through scaling and shifting the visual feature map once.

For training the model, a redescription similarity score (RSS) can be calculated using a pre-trained speaker model to generate requests given the input image and the synthesized image. Next, the similarity between generated requests and ground truth requests is calculated, where higher similarity indicates increased performance. The results can be used to update parameters of the model. Implementing the model on a grounded image editing request (GIER) dataset and a request-augmented dataset demonstrates the effectiveness of an image editing tool that incorporates the techniques described herein.

The user device 105 may be a personal computer, laptop computer, mainframe computer, palmtop computer, personal assistant, mobile device, or any other suitable processing apparatus. In some examples, the user device 105 includes image editing software that can communicate with the image editing apparatus 110. In other examples, the user device 105 includes components capable of directly performing the automatic image editing operations described herein.

According to some aspects, image editing apparatus 110 is located on a server connected to the user device 105 via the cloud 115. Specifically, the image editing apparatus 110 identifies an image and an edit command for the image, and automatically edits the image according to the edit command. In various embodiments, image editing apparatus 110 comprises a general-purpose computing device, a personal computer, a laptop computer, a mainframe computer, a supercomputer, or any other suitable processing apparatus.

A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). Image editing apparatus 110 is an example of, or includes aspects of, the corresponding element described with reference to FIG. 5.

The cloud 115 is a computer network configured to provide on-demand availability of computer system resources, such as data storage and computing power. In some examples, the cloud 115 provides resources without active management by the user 100. The term cloud is sometimes used to describe data centers available to many users 100 over the Internet. Some large cloud networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 can store images in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
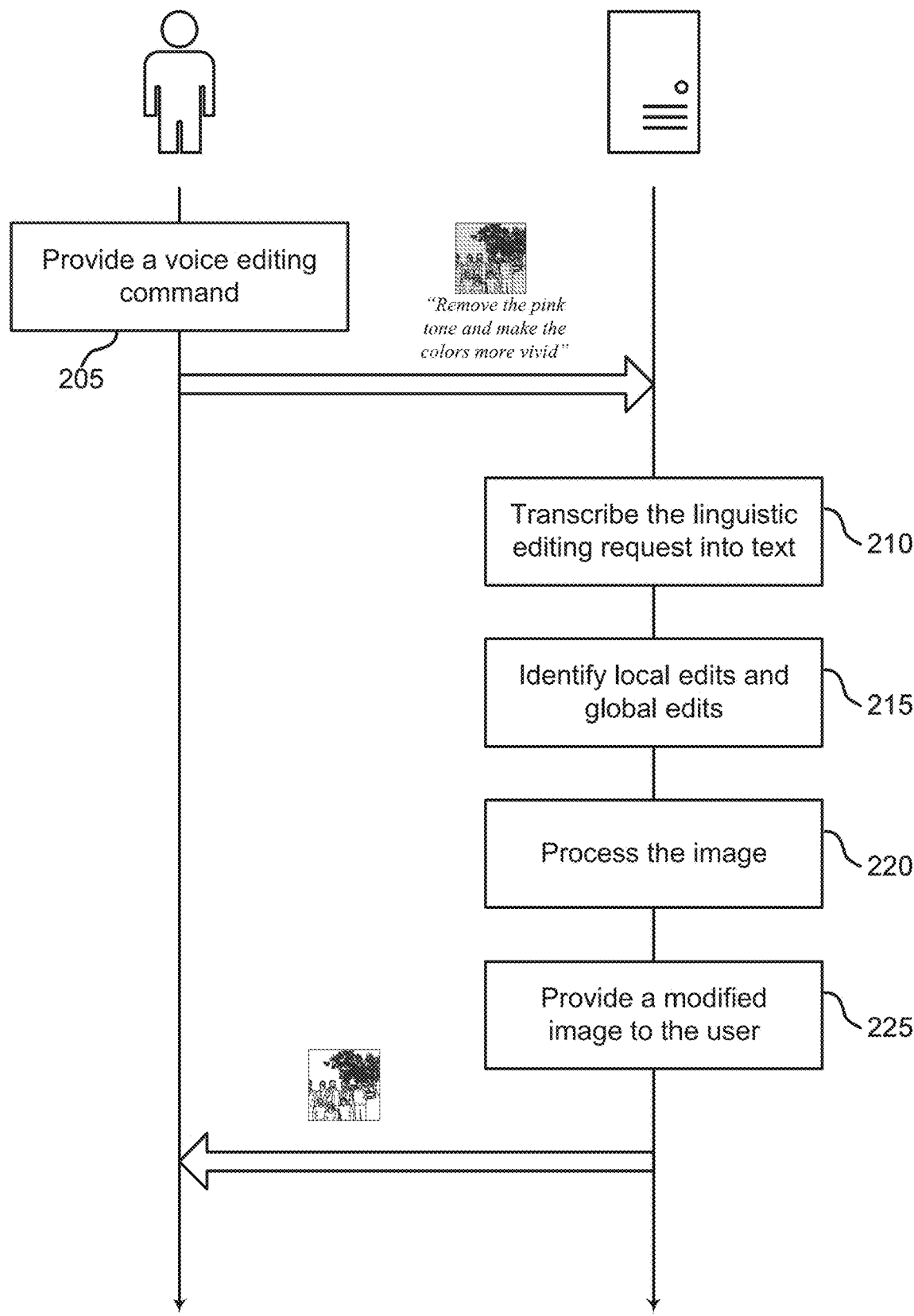
FIG. 2 shows an example of an image editing process according to aspects of the present disclosure.

FIG. 2 shows an example of an image editing process according to aspects of the present disclosure. Aspects of the process illustrated by FIG. 2 can be performed by an automatic image editing tool that can edit images using text-based requests (e.g., receive a text-based request from user). In one example, the editing tool may save time spent on the image editing work and may be used by a photography learner.

Conventional image editing tools use pre-defined global operations and thus are not able to handle unconstrained linguistic requests. Embodiments of the disclosure include an image editing tool that can realize spatial-adaptive photo editing using unconstrained linguistic requests. In some cases, a photo-request attention (PRA) is developed that learns the editing degree in each spatial location. The PRA makes the editing process spatially adaptive and interpretable. Additionally, a multi-modal modulation network is developed that embeds linguistic requests into modulation parameters, which are used to achieve editing by shifting and scaling the visual feature map. A multi-modal modulation network enables unconstrained linguistic requests. One or more embodiments include a metric called redescription similarity score to evaluate the match of edited results with requests.

At operation 205, the user identifies an image and provides a linguistic editing command. For example, the user may provide a voice command to "remove the pink tone and make the colors more vivid." In some examples, the linguistic editing command is provided using an audio device such as a microphone. In some cases, the operations of this step refer to, or may be performed by, a user as described with reference to FIG. 1.

At operation 210, the system transcribes the linguistic editing request into text. For example. The system may utilize speech-to-text software such as Julius or Kaldi.

At operation 215, the system identifies local edits and global edits. For example, the transcribed text can be encoded by a text encoder and divided into text that indicates an inpainting command and text that identifies a retouching command. In some cases, the operations of this step refer to, or may be performed by, an image editing apparatus as described with reference to FIGS. 1 and 5.

At operation 220, the system processes the image based on the local edits and global edits. For example, a retouching mask can be generated based on the retouching command and an inpainting mask can be generated based on the inpainting command. The inpainting mask can be applied to the image prior to encoding the image. Then, a photo-request attention module can use the retouching mask to generate attention weights for various parts of the image, and a multi-modal modulation component can translate the retouching command and the attention weights into modulation parameters for modifying the image features. Finally, a modified image can be generated based on the modified image features.

Conventional image editing methods set pre-defined operations and predict the editing parameters for these operations. For example, a rule-based approach maps user phrases to specific image editing operations and thus is not based on machine learning. In some cases, reinforcement learning is applied to learn the optimal parameters for predefined operations. In some cases, linguistic requests for image editing use predefined global operations. Alternatively, generative adversarial networks (GANs) can be used to learn predefined operators as a convolutional kernel. Thus, conventional methods can only process constrained linguistic requests that can be represented by the predefined set operations. However, by using a multi-modal modulation network in conjunction with a generative decoder, embodiments of the present disclosure can generate images with edits beyond those of a predetermined set of operations.

At operation 225, the system provides a modified image to the user. The modified image can represent the original image with modifications based on the linguistic editing request. In some examples, the modified image is provided from a server located on the cloud. In other examples, the modified image is generated and provided to the user via software located on a user device.

Figure 3:
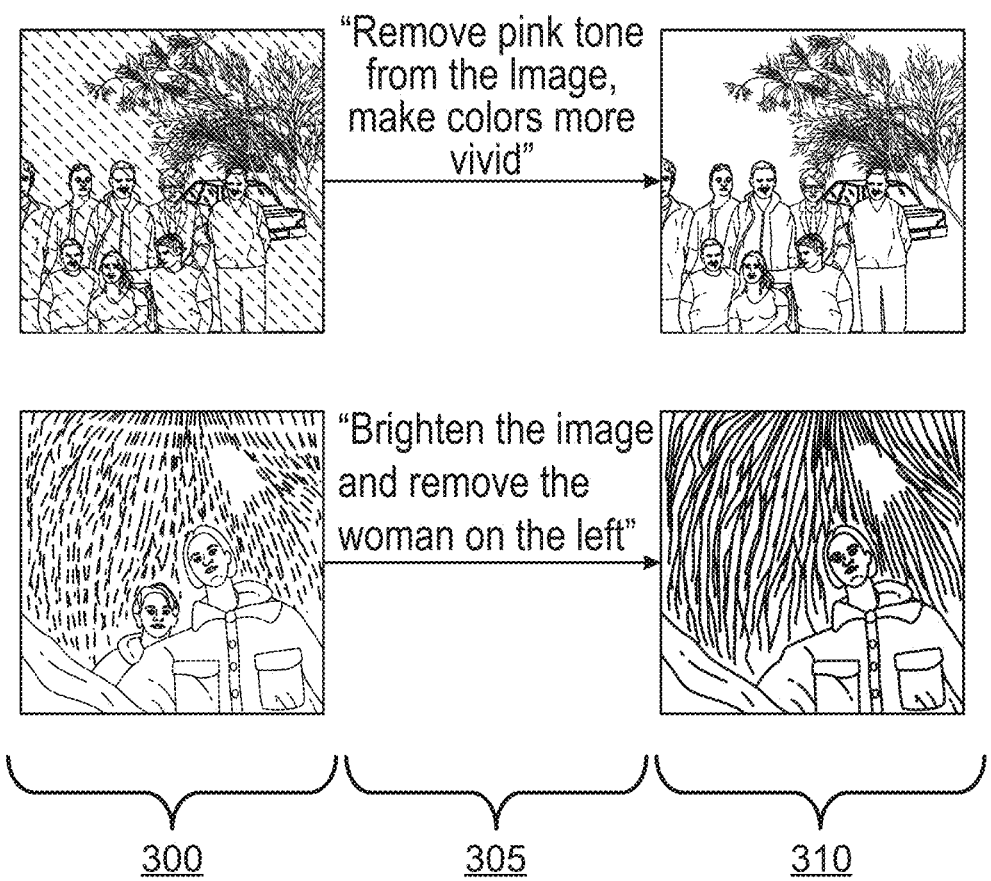
FIG. 3 shows an example of automated image editing according to aspects of the present disclosure.

FIG. 3 shows an example of automated image editing according to aspects of the present disclosure. The example shown includes original images 300, editing requests 305, and modified images 310. According to aspects of the present disclosure, the modified images 310 can be generated automatically from the original images 300 based on the editing requests 305.

Editing requests 305 can include multiple subcommands such as inpainting and retouching. Inpainting can include tasks such as adding or removing objects, or filling in gaps in the image. Image retouching includes global editing operations such as brightness, contrast, etc. Some requests may include multiple commands such as multiple retouching commands (e.g., "remove the pink tone from the image and make colors more vivid") or both an inpainting command and a retouching command (e.g., "brighten the image and remove the woman on the left"). In some examples, these linguistic editing requests are voice commands from a user and can be transcribed into text using speech-to-text software.

Figure 4:
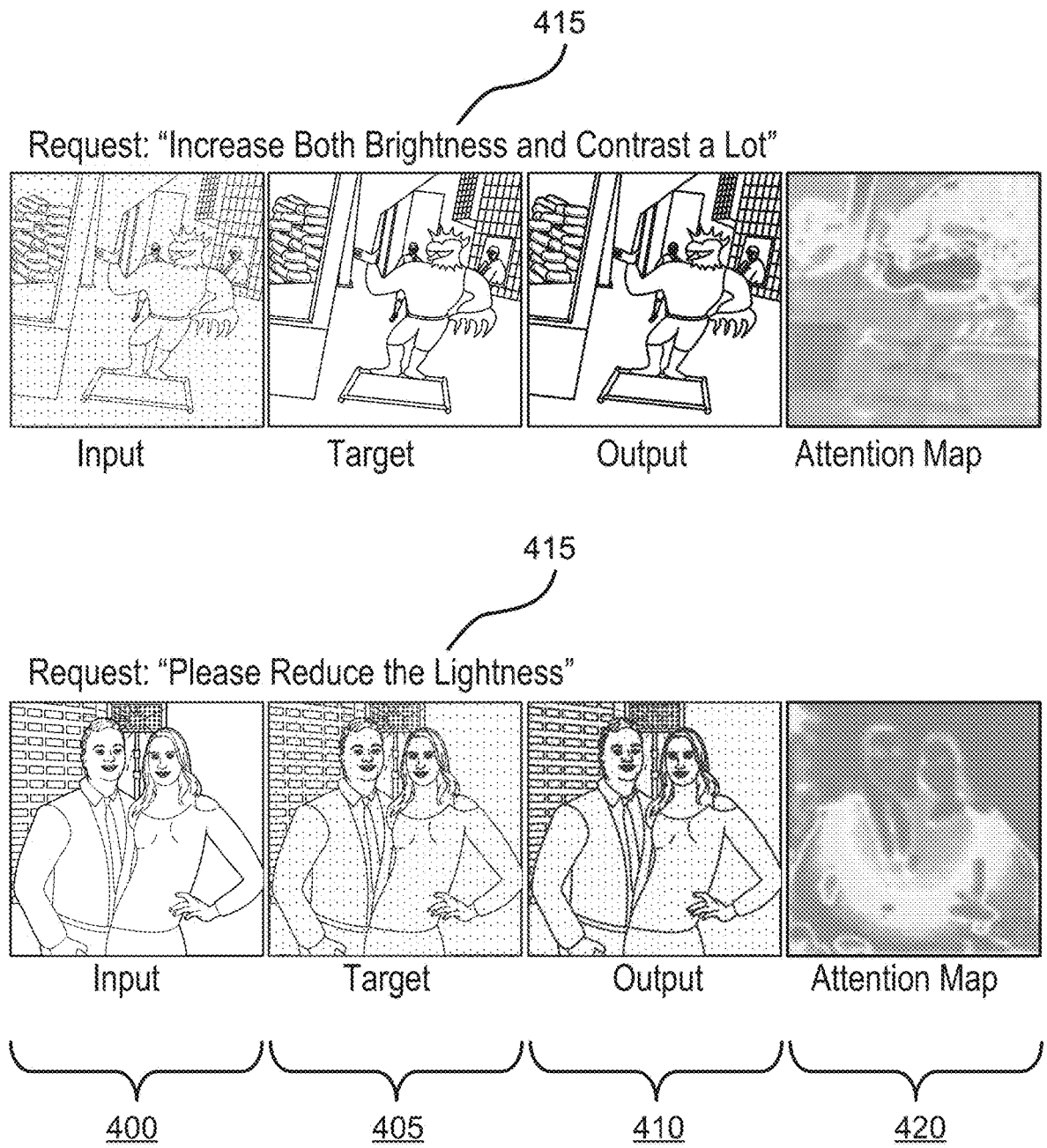
FIG. 4 shows an example of an attention map for automated image editing according to aspects of the present disclosure.

FIG. 4 shows an example of an attention map 420 for automated image editing according to aspects of the present disclosure. The example shown includes input images 400, target images 405, output images 410, edit requests 415, and attention maps 420. The output images 410 can be automatically generated based on the input images 400 according to the edit requests 415 to achieve the target images 405. The output images 410 can be generated based on attention maps 420 that indicate which portions of the image to apply the edit requests 415. The output images 410 can be generated using the systems described with reference to FIGS. 5-8 according the methods described with reference to FIGS. 9-13.

System Architecture

An apparatus for image processing is described with reference to FIGS. 5-8. One or more aspects of the apparatus include a text encoder configured to encode an edit command for an image to obtain an inpainting vector and a retouching vector; a phrase conditioned grounding (PCG) network configured to generate an inpainting mask based on the inpainting vector and a retouching mask based on the retouching vector; an image encoder configured to generate an image feature representation based on the image and the inpainting mask; a multi-modal modulation network configured to generate a modified image feature representation based on the image feature representation, the retouching mask, and an attention matrix calculated using the retouching vector; and a decoder configured to generate a modified image based on the modified image feature representation, wherein the modified image represents an application of the edit command to the image.

Some examples of the apparatus, system, and method further include a photo request attention (PRA) network configured to calculate an attention matrix based on the image feature representation and the retouching vector. In some aspects, the PRA network comprises an embedding network configured to embed the image feature representation and the retouching vector into a common embedding space.

Some examples of the apparatus, system, and method further include an audio input device configured to receive the edit command from a user, and to transcribe the edit command, wherein the encoding is based on the transcribed edit command. In some aspects, the text encoder comprises a Bidirectional long short-term memory (BiLSTM). In some aspects, the image encoder comprises a gated convolution layer.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Figure 5:
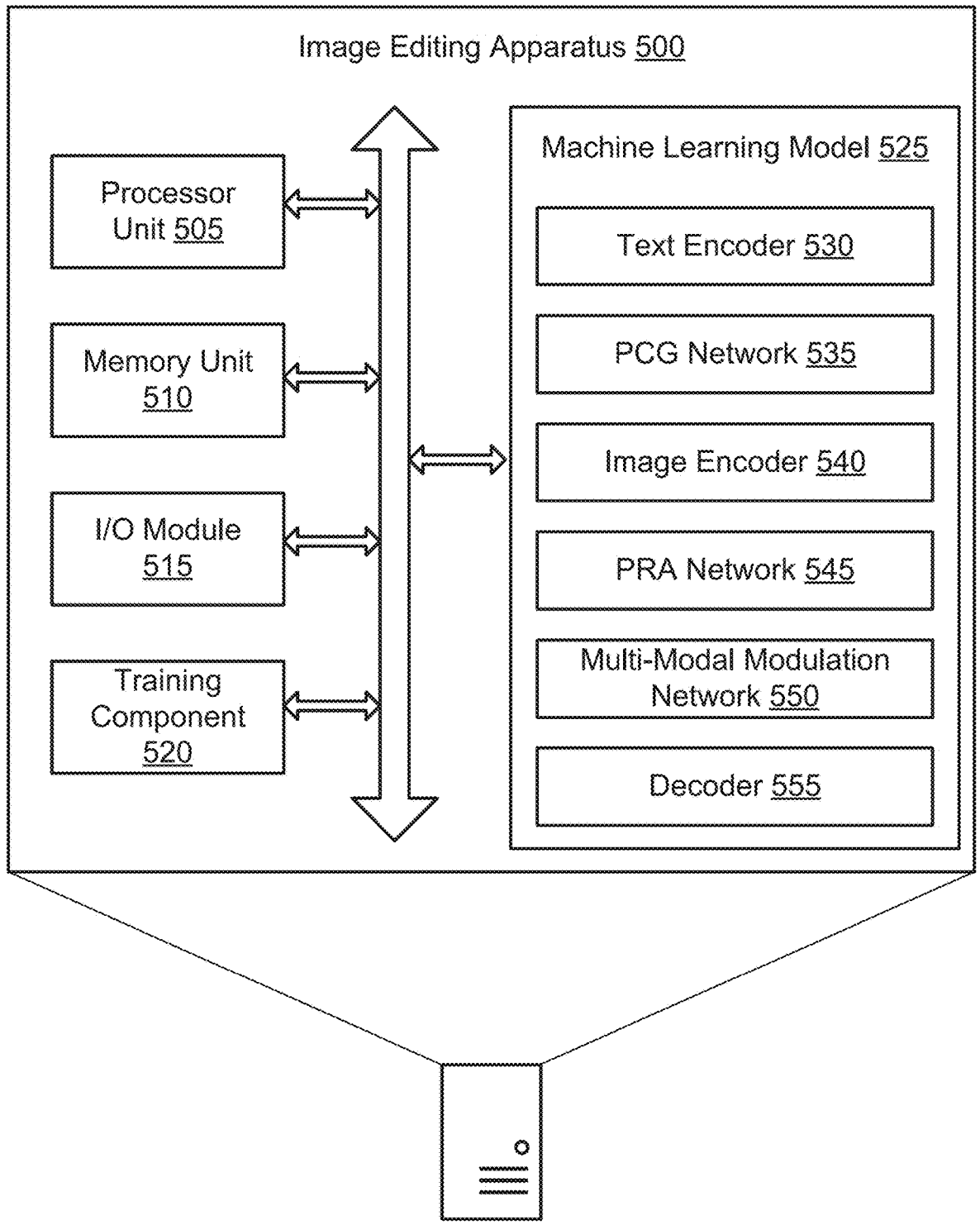
FIG. 5 shows an example of an image editing apparatus according to aspects of the present disclosure.

FIG. 5 shows an example of an image editing apparatus 500 according to aspects of the present disclosure. Image editing apparatus 500 is an example of, or can include aspects of, the corresponding element described with reference to FIG. 1. In one aspect, image editing apparatus 500 includes processor unit 505, memory unit 510, I/O module 515, training component 520, and machine learning model 525. In some examples, the I/O module 515 includes or connects to an audio input device of collecting audio information from a user (e.g., to process verbal editing requests).

A processor unit 505 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 505 is configured to operate a memory array using a memory controller. In other cases, a memory controller is integrated into the processor. In some cases, the processor unit 505 is configured to execute computer-readable instructions stored in a memory to perform various functions. In some embodiments, a processor unit 505 includes special purpose components for modem processing, baseband processing, digital signal processing, or transmission processing.

The memory unit 510 can include random access memory (RAM), read-only memory (ROM), or a hard disk. Examples of memory unit 510 include solid state memory and a hard disk drive. In some examples, memory unit 510 is used to store computer-readable, computer-executable software including instructions that, when executed, cause a processor to perform various functions described herein. In some cases, the memory unit 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An I/O module 515 manages input and output signals for a device. For example, the I/O module 515 may manage signals from an external audio device used to capture voice requests for editing an image. I/O module 515 may also manage peripherals not integrated into a device. In some cases, an I/O module 515 may represent a physical connection or port to an external peripheral. In some cases, an I/O module 515 may utilize an operating system such as iOS®, ANDROID®, MS-DOS®, MS-WINDOWS®, OS/2®, UNIX®, LINUX®, or another known operating system. In other cases, an I/O module 515 may represent or interact with a modem, a keyboard, a mouse, a touchscreen, or a similar device. In some cases, an I/O module 515 may be implemented as part of a processor. In some cases, a user may interact with a device via I/O module 515 or via hardware components controlled by an I/O module 515.

Training component 520 may be used to train a machine learning model 525. According to some embodiments, training component 520 receives training data including a training image, an edit command, and a ground truth image representing an application of the edit command to the training image. In some examples, training component 520 calculates a loss function based on the modified image and the ground truth image. In some examples, training component 520 trains a neural network based on the loss function. In some examples, training component 520 computes an unconditional adversarial loss using a discriminator network based on the modified image and the ground truth image. In some examples, training component 520 trains the neural network based on the unconditional adversarial loss. In some examples, the loss function includes an L1 loss.

Machine learning model 525 may be used to apply edit requests to an image. In some examples, machine learning model 525 may be implemented as an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, machine learning model 525 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, machine learning model 525 includes a recurrent neural network (RNN). An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

In some examples, the machine learning model 525 includes a generative adversarial network (GAN). A GAN is a class of machine learning models in which two neural networks compete with each other. For example, a generator network can generate an image, and a discriminator network can attempt to determine whether the image is a real image or a generated image.

Given a training set, a GAN can learn to generate new data with the same statistics as the training set. For example, a GAN trained on images can generate new images that look at least superficially authentic. GANs can be used for semi-supervised learning, fully supervised learning, and reinforcement learning.

According to some embodiments, a conditional generative adversarial network can be built using GANs to synthesize an image according to a conditional signal. An input conditional signal may include images, human poses, or semantic segmentation masks. Text-to-image synthesis, which learns a mapping from textual descriptions to images, is used to embed text information as a condition for a GAN. Variations of the GAN (e.g., semantic image synthesis GAN (SISGAN), text-adaptive GAN (TAGAN), GAN for image manipulation (ManiGAN), etc.) are developed based on the framework of text-to-image to manipulate the input image using textual descriptions. However, textual descriptions used in the GAN variation methods are similar to summarizing attributes of the target image.

For example, a TAGAN concatenates the text features and image features as the condition for GAN which lacks the design for multi-modal feature composition. ManiGAN calculates the attention between words and image patches which may not work on less detailed descriptions of target images. Similarly, a generative neural visual artists (Ge-NeVA) task and a GeNeVA-GAN can used for iterative image generation, where a new object may be added individually following linguistic requests. However, such methods focus on iterative editing and do not work on real-world scenarios. Embodiments of the present disclosure include an image editing tool that uses PRA and multi-modal modulation algorithms, models linguistic requests and can be applied on real-world scenarios.

In one embodiment, machine learning model 525 includes text encoder 530, phrase conditioned grounding (PCG) network 535, image encoder 540, photo request attention (PRA) network 545, multi-modal modulation network 550, and decoder 555.

According to some embodiments, text encoder 530 encodes the edit command to obtain an inpainting vector and a retouching vector. In some examples, text encoder 530 generates a word embedding for each of a set of words of the edit command. In some examples, text encoder 530 generates a probability vector that includes an inpainting probability and a retouching probability for each of the set of words. In some examples, text encoder 530 applies the inpainting probability to a corresponding word of the set of words to obtain an inpainting weighted word representation, where the inpainting vector includes the inpainting weighted word representation. In some examples, text encoder 530 applies the retouching probability to a corresponding word of the set of words to obtain a retouching weighted word representation, where the retouching vector includes the retouching weighted word representation. In some aspects, the inpainting vector indicates a local edit of the image. In some aspects, the retouching vector indicates a global edit of the image.

In some aspects, the text encoder 530 includes a bidirectional long short-term memory (Bi-LSTM). A Bi-LSTM is a form of RNN that includes feedback connections. In one example, LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN. Text encoder 530 is an example of, or includes aspects of, the corresponding element described with reference to FIG. 6.

According to some embodiments, PCG network 535 generates an inpainting mask based on an inpainting vector (or inpainting text) and a retouching mask based on a retouching vector (or retouching text). In some examples, PCG network 535 encodes an image to generate image features. In some examples, PCG network 535 identifies an inpainting object based on the edit command. In some examples, PCG network 535 generates attention weights based on the edit command in the inpainting object. In some examples, PCG network 535 generates the inpainting mask based on the image features and the attention weights. In some examples, PCG network 535 determines whether the retouching vector indicates a global edit. In some examples, PCG network 535 generates the retouching mask based on the determination. PCG network 535 is an example of, or includes aspects of, the corresponding element described with reference to FIG. 6.

According to some embodiments, image encoder 540 generates an image feature representation based on the image and the inpainting mask. In some examples, image encoder 540 encodes the image to generate the image features. In some examples, image encoder 540 applies the inpainting mask to the image features to obtain an inpainting image features. In some examples, image encoder 540 performs a convolution operation on the inpainting image features to obtain the image feature representation. For example, the image encoder 540 can comprise a CNN. In some aspects, the image encoder 540 includes a gated convolution layer. Image encoder 540 is an example of, or includes aspects of, the corresponding element described with reference to FIG. 6.

According to some embodiments, PRA network 545 calculates an attention matrix based on the image feature representation and the retouching vector. In some examples, PRA network 545 expands the retouching vector based on the retouching mask to obtain an expanded retouching vector. In some examples, PRA network 545 weights the expanded retouching vector based on the attention matrix to obtain a weighted retouching vector.

In some embodiments, the PRA network 545 includes an embedding network configured to embed the image feature representation and the retouching vector into a common embedding space. PRA network 545 can be an attention network. An attention mechanism is a method of placing differing levels of importance on different elements of an input. Calculating attention may involve three basic steps. First, compute the similarity between query and key vectors obtained from the input to generate attention weights. Similarity functions may include dot product, splice, detector, etc. Next, use a softmax function to normalize the weights. Finally, weigh the attention weights in together with the corresponding values. PRA network 545 is an example of, or includes aspects of, the corresponding element described with reference to FIGS. 6 and 7.

According to some embodiments, multi-modal modulation network 550 generates a modified image feature representation based on the image feature representation, the retouching mask, and an attention matrix calculated using the retouching vector. In some examples, multi-modal modulation network 550 generates a scaling parameter and a shifting parameter based on the weighted retouching vector. In some examples, multi-modal modulation network 550 adds the shifting parameter to a product of the scaling parameter and the image feature representation to obtain the modified image feature representation. Multi-modal modulation network 550 is an example of, or includes aspects of, the corresponding element described with reference to FIGS. 6 and 7.

According to some embodiments, decoder 555 generates a modified image based on the modified image feature representation, where the modified image represents an application of the edit command to the image. In some examples, decoder 555 performs a convolution operation on the modified image feature representation to obtain the modified image. In some cases, decoder 555 includes a gated convolution layer. Decoder 555 is an example of, or includes aspects of, the corresponding element described with reference to FIG. 6.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 6:
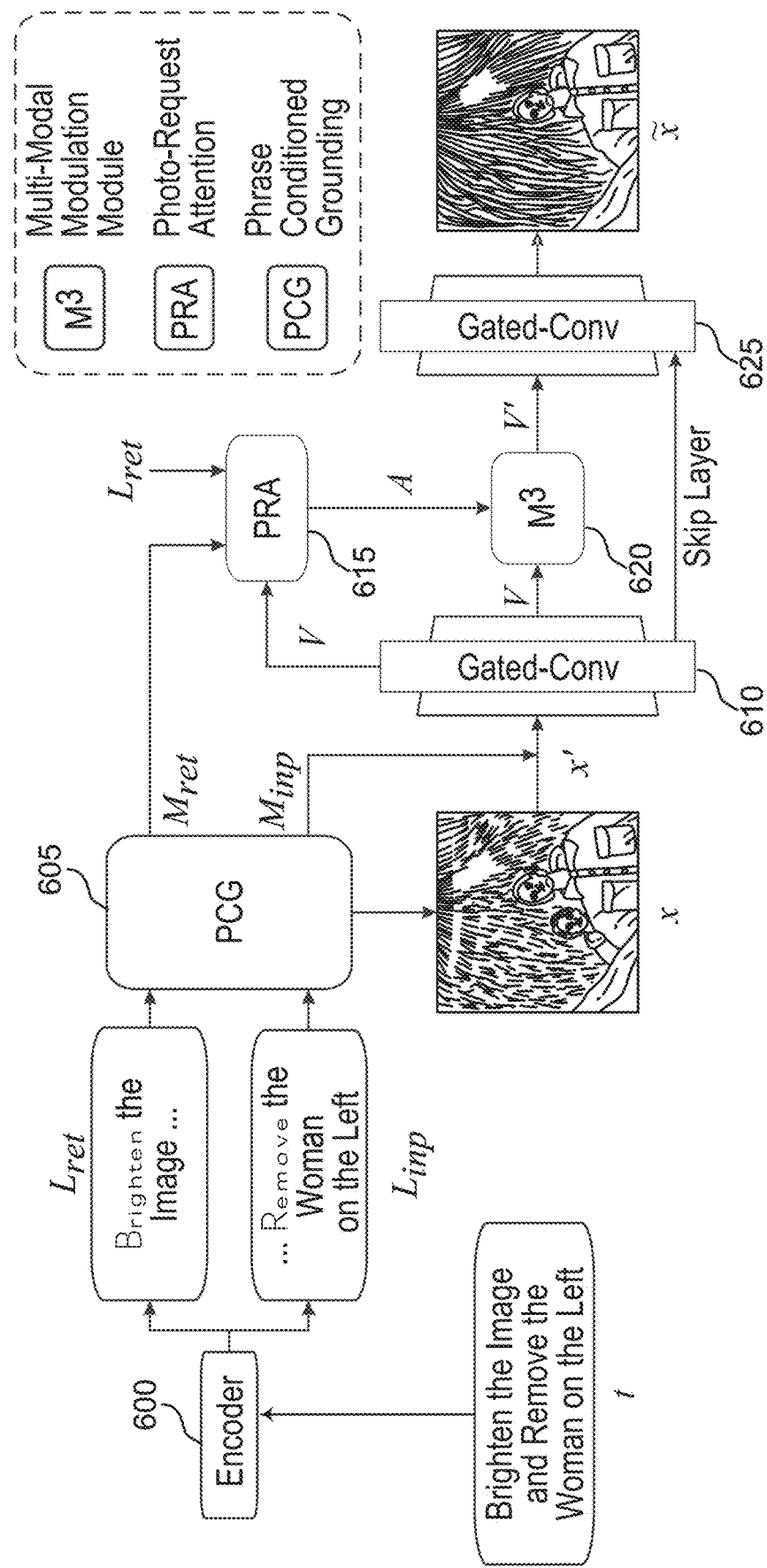
FIG. 6 shows an example of a machine learning model for image editing according to aspects of the present disclosure.

FIG. 6 shows an example of a machine learning model for image editing according to aspects of the present disclosure. The example shown includes text encoder 600, PCG network 605, image encoder 610, PRA network 615, multi-modal modulation network 620, and decoder 625.

The image editing apparatus edits a given photo x according to the modification specified in the input linguistic request t to produce the output edited photo $\tilde{x}$. Accordingly, there are two types of linguistic requests, inpainting (e.g., remove the woman on the left) and retouching (e.g., brighten the image). In some cases, the model localizes areas to edit followed by inpainting and retouching operations using different modules. A gated convolution is applied to the layers of the model for the inpainting operation. Additionally, photo-request attention predicts the degree of editing in the spatial dimension for reasonable editing for the retouching operation. The retouching is performed by modeling linguistic requests as modulation parameters that modify the image feature maps in the desired locations of the image.

A neural network encoder (e.g., a BiLSTM encoder) extracts the linguistic features $L=[l_1, l_2, \ldots, l_T] \in \mathbb{R}^{T \times C_l}$ from the input linguistic request t, where $l_i \in \mathbb{R}^{C_l}$ is the embedding of the i-th word, T is the length of the input linguistic request. The input linguistic request is classified into a retouching phrase and an inpainting phrase. The probability vector for the i-th word is described as $p_i=[p_i^{ret}, p_i^{inp}] \in \mathbb{R}^2$ that is calculated by $$p_i = \text{softmax}(W_p l_i + b_p) \qquad (1)$$

where $W_p \in \mathbb{R}^{2 \times C_l}$ and $b_p \in \mathbb{R}^2$ are learnable parameters, $p_i^{ret}$ and $p_i^{inp}$ denote the probabilities of the i-th word being included in the retouching phrase and inpainting phrase, respectively.

The inpainting phrase $L_{inp}$ and retouching phrase $L_{ret}$ can be calculated as weighted word embeddings by:

$$L_j = [p_1^j l_1, p_2^j l_2, \ldots, p_T^j l_T] \qquad (2)$$

where $j \in \{inp, ret\}$.

A PCG network 605 is used to locate areas to edit for each phrase. Given the input phrase L, a binary classifier $f_{valid}$ is used to decide the presence of a valid phrase. For example, the inpainting phrase is not a valid phrase for a request to "brighten the image". The grounding model is applied when the input phrase is valid. The inpainting operation is a local editing operation while the retouching operation may be global.

Another binary classifier $f_{global}$ can used to decide whether the input phrase $L_{ret}$ indicates a global editing for valid retouching phrase. A grounding model $f_{ground}$ (e.g., MattNet) can be used to perform localization. The PCG network 605 takes image features V and language phrases $L_{inp}$ and $L_{ret}$ as inputs and outputs the corresponding masks $M_{inp}$ and $M_{ret}$ by:

$$M_j = \begin{cases} f_{ground}(L_j, V), & f_{valid}(L_j) = 1, f_{global}(L_j) = 0 \\ 1, & f_{valid}(L_j) = 1, f_{global}(L_j) = 1 \\ 0, & f_{valid}(L_j) = 0, \end{cases} \qquad (3)$$

where $j \in \{inp, ret\}$ and $f_{global}=0$ when j=inp. The ground truth mask annotated in a training dataset can be used to pre-train the grounding model.

In some cases, an image encoder 610 including a gated convolution layer can be used for inpainting. The PRA network 615, and the multi-modal modulation network 620 can be used for retouching after obtaining the inpainting phrase $L_{inp}$, retouching phrase $L_{ret}$ and the corresponding mask $M_{inp}$ and $M_{ret}$.

In some cases, an object in the original input image x is erased after obtaining the $M_{inp}$ for inpainting by:

$$x'=x \odot (1-M_{inp}) \qquad (4)$$

where $\odot$ indicates the Hadamard product. In some examples, an image editing tool takes the image x' which has erased the inpainting object as input. Gated convolutions are used in the layers of the framework, which fill the inpainting area by context features. The feature map $V_i$ of input image x' in i-th convolution layer is calculated as:

$$\text{Gating}_{i-1}=V_{i-1}W_g$$

$$\text{Feature}_{i-1}=V_{i-1}W_f$$

$$V_i=\phi(\text{Feature}_{i-1}) \odot \sigma(\text{Gating}_{i-1}) \qquad (5)$$

where $\sigma$ is sigmoid function with output gating values between 0 and 1, $\phi$ is LeakyReLU activation function. $W_g$ and $W_f$ are different convolutional filters. The feature map $V_i$ is sent to the retouching part and finally passed through the decoder 625 to generate the output edited image $\tilde{x}$.

Text encoder 600, PCG network 605, and image encoder 610, and decoder 625 are examples of, or includes aspects of, the corresponding element described with reference to FIG. 5. PRA network 615 and multi-modal modulation network 620 are examples of, or includes aspects of, the corresponding element described with reference to FIGS. 5 and 7.

Figure 7:
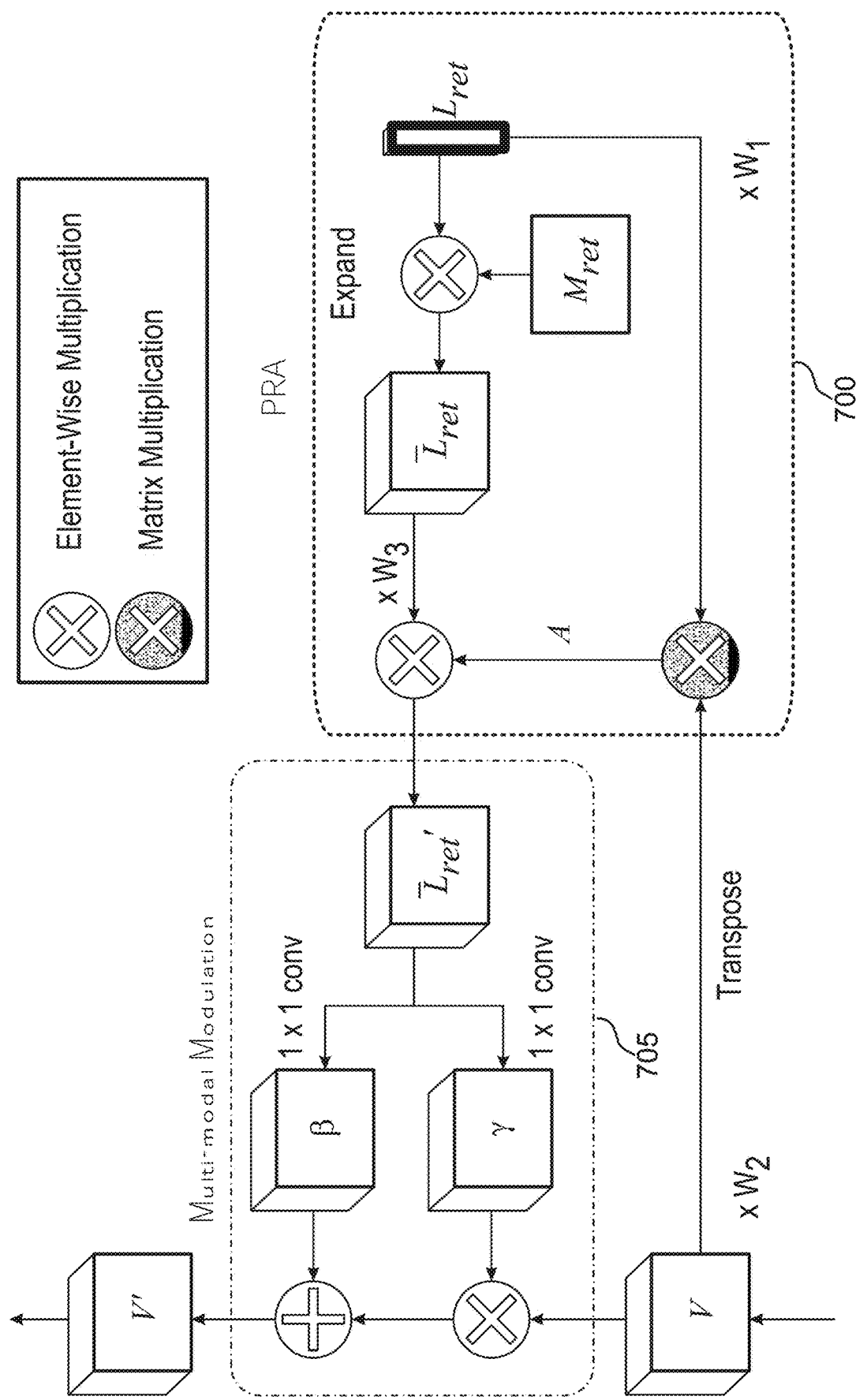
FIG. 7 shows an example of a photo request attention (PRA) network and multi-modal modulation network according to aspects of the present disclosure.

FIG. 7 shows an example of a PRA network 700 and a multi-modal modulation network 705 according to aspects of the present disclosure. Conventional image editing systems are only capable of automatically applying user editing requests if the requests are both detailed and simple, for example, a request to lighten all portions of an image. However, embodiments of the present disclosure can apply a wide variety of global editing requests differentially to different parts of an image even if the request is vague.

This is accomplished using the PRA network 700 and the multi-modal modulation network 705. PRA network 700 and multi-modal modulation network 705 are examples of, or includes aspects of, the corresponding element described with reference to FIGS. 5 and 6.

According to embodiments of the present disclosure, an image editing tool adaptively edits the photo according to the correlation of the input photo and the request. The PRA network 700 first embeds visual features $V \in \mathbb{R}^{C_v \times H \times W}$ and the retouching phrase $L_{ret} \in \mathbb{R}^{C_l \times 1}$ into the same embedding space. An attention matrix $A \in \mathbb{R}^{H \times W}$ is calculated by:

$$A = \text{Sigmoid}((W_1 L_{ret})^T (W_2 V)) \quad (6)$$

where $W_1 \in \mathbb{R}^{C_v \times C_l}$ and $W_2 \in \mathbb{R}^{C_v \times C_v}$ are learnable parameters. The sigmoid function can be used to normalize the weight of degree into [0, 1]. The attention calculates the multi-modal similarity such that large values of A indicate high degree of editing.

Retouching phrase embedding $L_{ret}$ is expanded in the spatial dimension to obtain the spatially adaptive condition for image synthesis. Next, localization is performed in areas to be edited by $M_{ret}$ as:

$$\overline{L}_{ret} = \text{expand}(L_{ret}) \odot M_{ret} \quad (7)$$

where $\overline{L}_{ret} \in \mathbb{R}^{C_l \times H \times W}$ is the expanded linguistic embedding. The elements in $\overline{L}_{ret}$ are reweighted using the attention matrix A to obtain $\overline{L}'_{ret} \in \mathbb{R}^{C_v \times H \times W}$ by $$\overline{L}'_{ret} = W_3 \overline{L}_{ret} \odot A \quad (8)$$

where $W_3 \in \mathbb{R}^{C_v \times C_l}$ is a learnable parameter, $\odot$ denotes the Hadamard product. The language embedding after reweighting $\overline{L}'_{ret}$ is input to the multi-modal modulation network to serve as the conditional signal for editing.

The multi-modal modulation network 705 bridges the language space and vision space for conditional image synthesis by directly modeling the linguistic request as modulation parameters that are used to modify the visual feature maps.

The modulation parameters $\gamma \in \mathbb{R}^{C_v \times H \times W}$ and $\beta \in \mathbb{R}^{C_v \times H \times W}$ are generated after obtaining the weighted language embedding $\overline{L}'_{ret}$ by $$\gamma = W_\gamma \overline{L}'_{ret}$$

$$\beta = W_\beta \overline{L}'_{ret} \quad (9)$$

wherein $W_\gamma \in \mathbb{R}^{C_v \times C_v}$ and $W_\beta \in \mathbb{R}^{C_v \times C_v}$ are learnable convolutional filters. The produced modulation parameters $\gamma$ and $\beta$ achieve the image retouching through scaling and shifting the visual feature map $V \in \mathbb{R}^{C_v \times H \times W}$ for one time. The edited visual feature map V' is calculated by:

$$V' = \gamma \odot V + \beta \quad (10)$$

Then, the edited visual feature map V' is then input to the subsequent decoder for generating the result $\tilde{x}$.

Accordingly, the photo-request attention process calculates the attention weights for embedding linguistic requests and patches on visual feature maps in an image editing tool. The calculated weight matrix indicates the degree of editing for each location. The use of weight matrix works in situations when the request is vague and simple. For underexposed input images with vague requests like brightening the photo or increasing the brightness and contrast, the PRA learns to assign appropriate editing degree in spatial dimension by a high increase in the lightness of dark areas and a low increase in bright areas of the image. Alternatively, for an overexposed photo with a request that needs to reduce the lightness, PRA can decrease the brightness of the light and the circular halo accurately.

Figure 8:
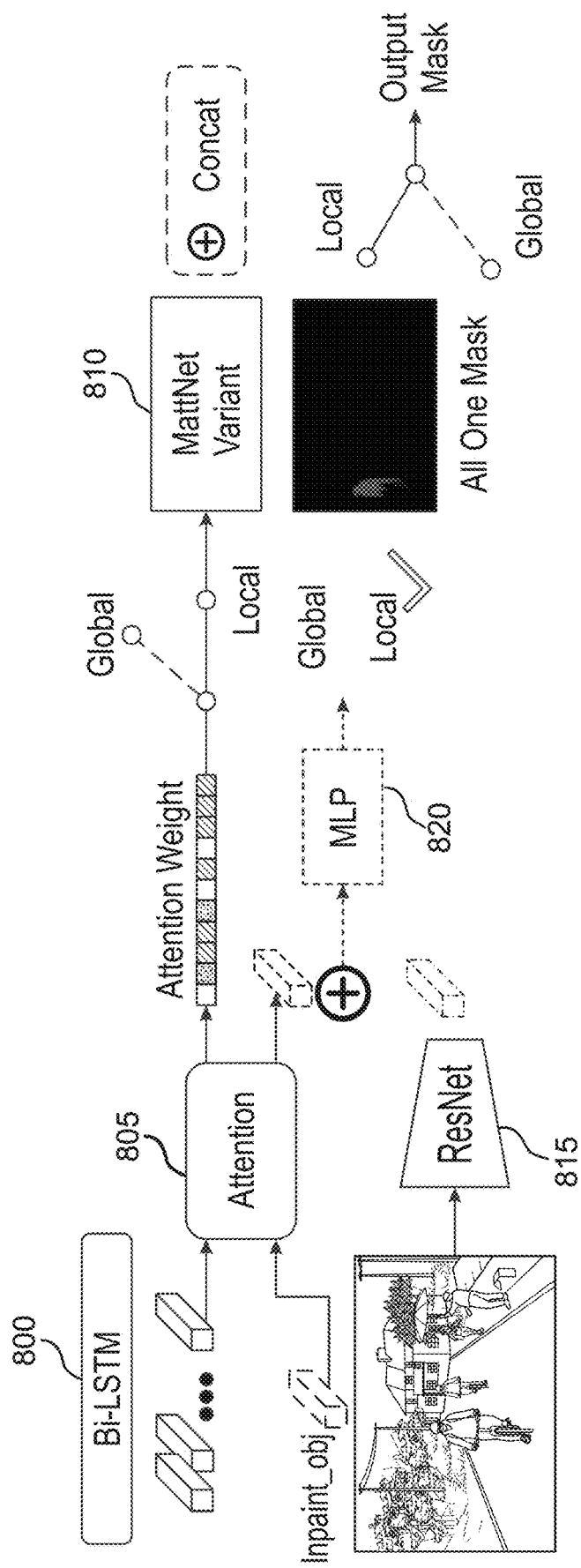
FIG. 8 shows an example of a phrase conditioned grounding (PCG) network according to aspects of the present disclosure.

FIG. 8 shows an example of a PCG network according to aspects of the present disclosure. The network depicted in FIG. 8 is an example of the PCG network 605 described with reference to FIG. 6, and can be used to generate an inpainting mask and a retouching mask. The example shown includes text encoder 800 (e.g., a Bi-LSTM), attention network 805, modular attention network 810 (e.g., MattNet), convolution network 815 (e.g., a ResNet), and classifier network 820 (e.g., an MLP network).

The text encoder 800 may generate word embeddings based on text. A word embedding is a learned representation for text where words that have the same meaning have a similar representation. BERT, Glove and Word2vec are examples of systems for obtaining a vector representation of words. BERT is a Bidirectional Encoder Representations from Transformers. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

The attention network 805 can be used to determine which words are relevant for determining particular aspects of an edit request (e.g., a retouching request or an inpainting request relevant to a particular inpainting object). Thus, in some cases an inpainting object is fed into the attention network 805 to identify which words correspond to the inpainting object. In some cases, multiple phrases can be output by the attention network 805 (e.g., multiple retouching phrases, or a retouching phrase and an inpainting phrase).

The modular attention network 810 can be used to localize an image region described by a natural language expression. For example, an inpainting mask can be generated that corresponds to an inpainting command, or a retouching mask can be generated that corresponds to a retouching command.

A convolution network 815 can take an image and output image features, which can be used to generate a retouching mask or an inpainting mask. In some examples, the convolution network 815 comprises a ResNet model.

A classifier network 820 can determine whether a word or phrase corresponds to an inpainting command (i.e., a local command) or a retouching command (i.e., a global command). In some cases, a retouching command is used to edit several portions of an image, but the edits may not correspond to the whole image, or to the whole image equally. In some cases, the classifier network 820 is a multilayer perceptron (MLP). An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

Inference

Methods for image processing is described with reference to FIGS. 9-13. One or more aspects of the method include identifying an image and an edit command for the image; encoding the edit command to obtain an inpainting vector and a retouching vector; generating an inpainting mask based on the inpainting vector and a retouching mask based on the retouching vector; generating an image feature representation based on the image and the inpainting mask;

generating a modified image feature representation based on the image feature representation, the retouching mask, and an attention matrix calculated using the retouching vector; and generating a modified image based on the modified image feature representation, wherein the modified image represents an application of the edit command to the image.

Some examples of the method, apparatus, non-transitory computer readable medium, and system further include receiving the edit command from a user via a voice command. Some examples further include transcribing the edit command, wherein the encoding is based on the transcribed edit command.

Some examples of the method, apparatus, non-transitory computer readable medium, and system further include generating a word embedding for each of a plurality of words of the edit command. Some examples further include generating a probability vector that includes an inpainting probability and a retouching probability for each of the plurality of words. Some examples further include applying the inpainting probability to a corresponding word of the plurality of words to obtain an inpainting weighted word representation, wherein the inpainting vector includes the inpainting weighted word representation. Some examples further include applying the retouching probability to a corresponding word of the plurality of words to obtain a retouching weighted word representation, wherein the retouching vector includes the retouching weighted word representation.

Some examples of the method, apparatus, non-transitory computer readable medium, and system further include encoding the image to generate image features. Some examples further include identifying an inpainting object based on the edit command. Some examples further include generating attention weights based on the edit command in the inpainting object. Some examples further include generating the inpainting mask based on the image features and the attention weights.

Some examples of the method, apparatus, non-transitory computer readable medium, and system further include determining whether the retouching vector indicates a global edit. Some examples further include generating the retouching mask based on the determination.

Some examples of the method, apparatus, non-transitory computer readable medium, and system further include encoding the image to generate image features. Some examples further include applying the inpainting mask to the image features to obtain an inpainting image features. Some examples further include performing a convolution operation on the inpainting image features to obtain the image feature representation.

Some examples of the method, apparatus, non-transitory computer readable medium, and system further include calculating an attention matrix based on the image feature representation and the retouching vector. Some examples further include expanding the retouching vector based on the retouching mask to obtain an expanded retouching vector. Some examples further include weighting the expanded retouching vector based on the attention matrix to obtain a weighted retouching vector.

Some examples of the method, apparatus, non-transitory computer readable medium, and system further include generating a scaling parameter and a shifting parameter based on the weighted retouching vector. Some examples further include adding the shifting parameter to a product of the scaling parameter and the image feature representation to obtain the modified image feature representation.

Some examples of the method, apparatus, non-transitory computer readable medium, and system further include performing a convolution operation on the modified image feature representation to obtain the modified image. In some examples, the inpainting vector indicates a local edit of the image. In some examples, the retouching vector indicates a global edit of the image.

Figure 9:
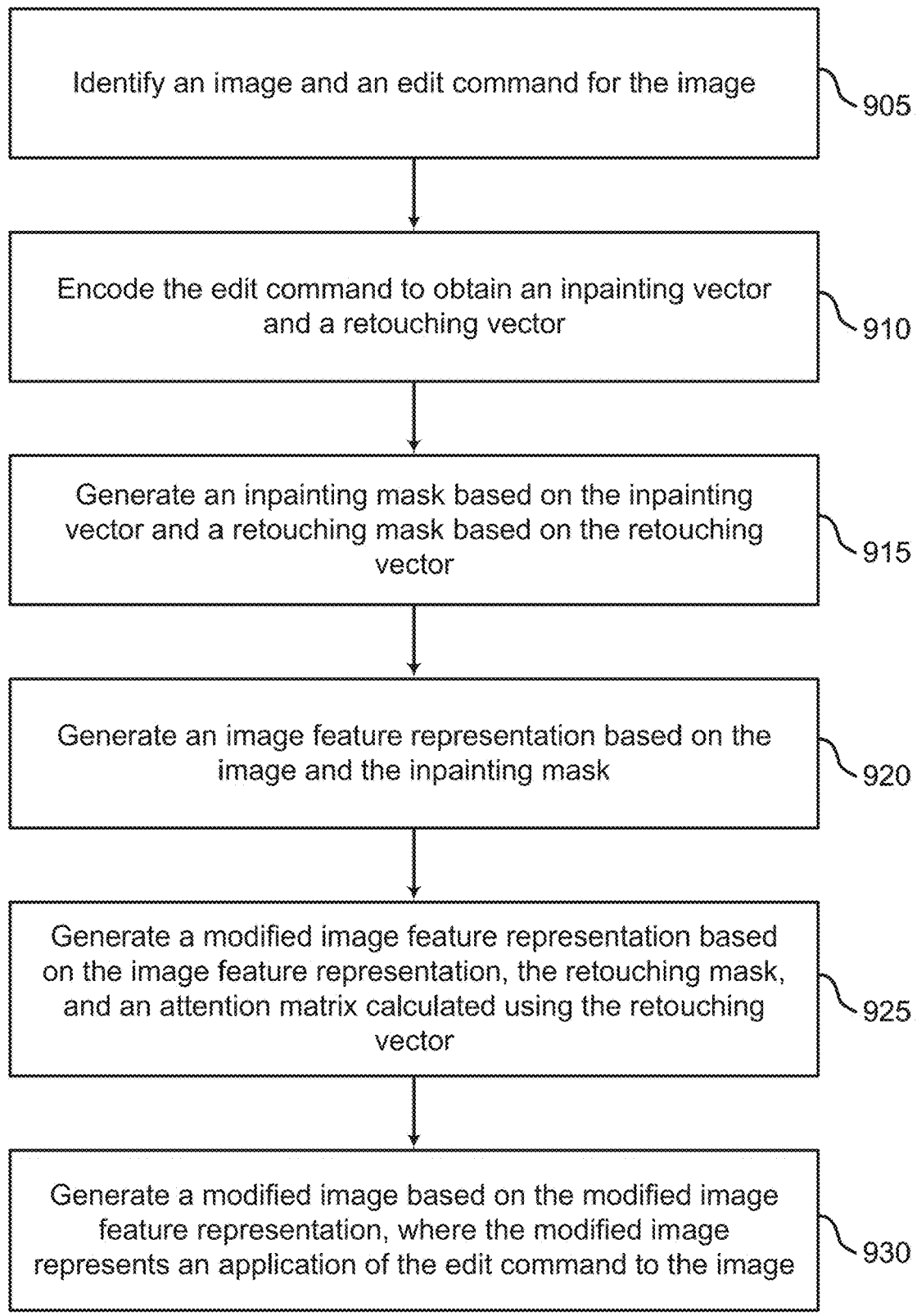
FIG. 9 shows an example of image processing according to aspects of the present disclosure.

FIG. 9 shows an example of image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies an image and an edit command for the image. According to aspects of the disclosure, the edit command can include vague terms, and may include an intent to perform both inpainting and retouching edits as described with reference to FIGS. 2-4. In some cases, the operations of this step refer to, or may be performed by, an image editing apparatus as described with reference to FIGS. 1 and 5.

At operation 910, the system encodes the edit command to obtain an inpainting vector and a retouching vector. Further detail regarding the process for generating the inpainting vector and a retouching vector is provided with reference to the text encoder of FIG. 6 and with reference to the flowchart in FIG. 10. In some cases, the operations of this step refer to, or may be performed by, a text encoder as described with reference to FIGS. 5 and 6.

At operation 915, the system generates an inpainting mask based on the inpainting vector and a retouching mask based on the retouching vector. Further detail regarding the process for generating the inpainting mask is provided with reference to the PCG network of FIG. 6 and with reference to the flowchart in FIG. 11. In some cases, the operations of this step refer to, or may be performed by, a PCG network as described with reference to FIGS. 5 and 6.

At operation 920, the system generates an image feature representation based on the image and the inpainting mask. Further detail regarding the process for generating the image feature representation is provided with reference to the image encoder of FIG. 6 and with reference to the flowchart in FIG. 12. In some cases, the operations of this step refer to, or may be performed by, an image encoder as described with reference to FIGS. 5 and 6.

At operation 925, the system generates a modified image feature representation based on the image feature representation, the retouching mask, and an attention matrix calculated using the retouching vector. Further detail regarding the process for generating the modified image feature representation is provided with reference to the photo-request attention network and a multi-modal modulation network of FIG. 7 and with reference to the flowchart of FIG. 13. In some cases, the operations of this step refer to, or may be performed by, a photo-request attention network and a multi-modal modulation network as described with reference to FIGS. 5-7.

At operation 930, the system generates a modified image based on the modified image feature representation, where the modified image represents an application of the edit command to the image. In some examples, the modified image is generated by an image decoder as described with reference to FIG. 6. In some examples, the decoder includes a gated convolution layer. In some cases, the decoder comprises a GAN. In some cases, the operations of this step refer to, or may be performed by, a decoder as described with reference to FIGS. 5 and 6.

Figure 10:
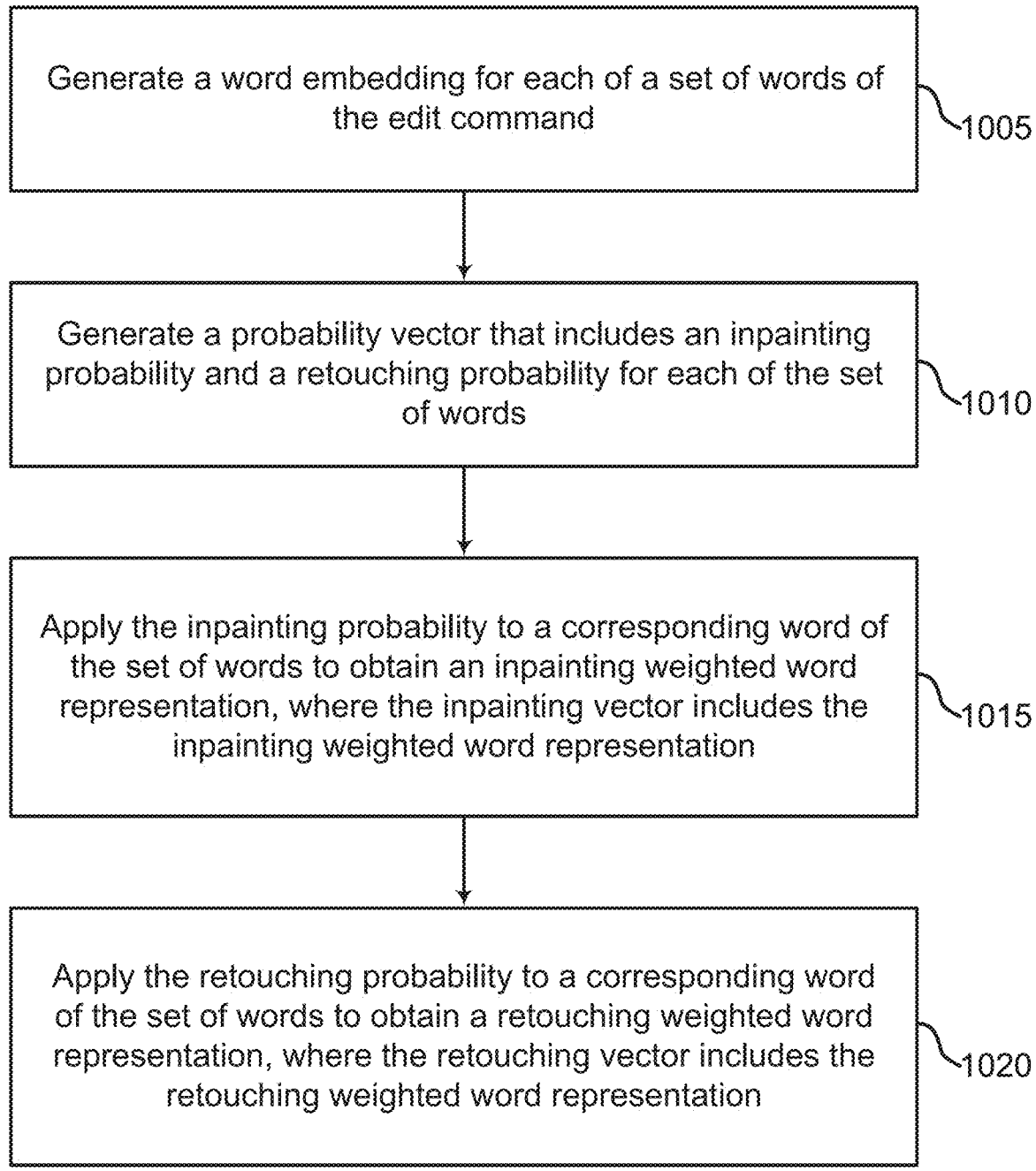
FIG. 10 shows an example of a process of generating a retouching vector based on an edit command according to aspects of the present disclosure.

FIG. 10 shows an example of a process of generating a retouching vector based on an edit command according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates a word embedding for each of a set of words of the edit command. In some cases, the operations of this step refer to, or may be performed by, a text encoder as described with reference to FIGS. 5 and 6.

At operation 1010, the system generates a probability vector that includes an inpainting probability and a retouching probability for each of the set of words. In some cases, the operations of this step refer to, or may be performed by, a text encoder as described with reference to FIGS. 5 and 6.

At operation 1015, the system applies the inpainting probability to a corresponding word of the set of words to obtain an inpainting weighted word representation, where the inpainting vector includes the inpainting weighted word representation. In some cases, the operations of this step refer to, or may be performed by, a text encoder as described with reference to FIGS. 5 and 6.

At operation 1020, the system applies the retouching probability to a corresponding word of the set of words to obtain a retouching weighted word representation, where the retouching vector includes the retouching weighted word representation. In some cases, the operations of this step refer to, or may be performed by, a text encoder as described with reference to FIGS. 5 and 6.

Figure 11:
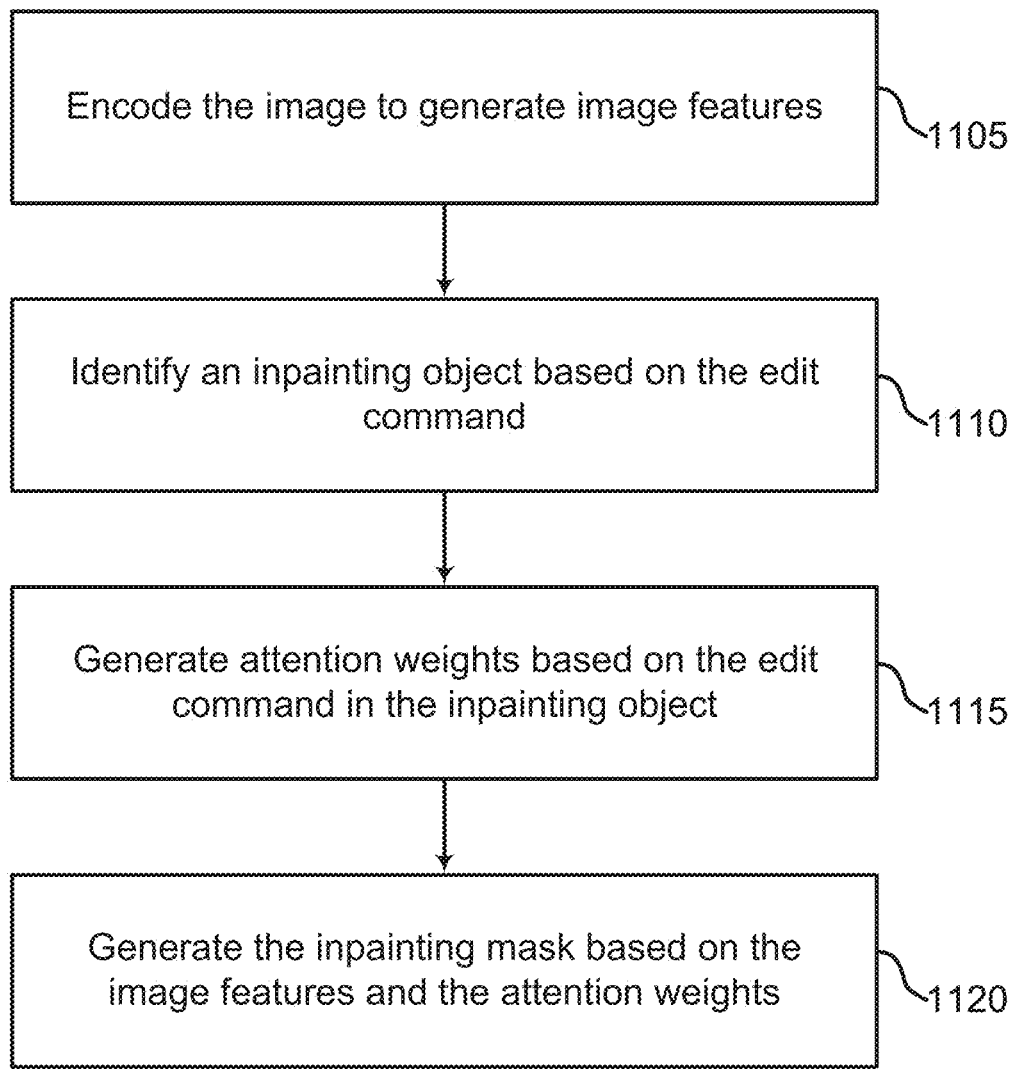
FIG. 11 shows an example of generating an inpainting mask according to aspects of the present disclosure.

FIG. 11 shows an example of a method for generating an inpainting mask according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system encodes the image to generate image features. In some cases, the operations of this step refer to, or may be performed by, a PCG network as described with reference to FIGS. 5 and 6.

At operation 1110, the system identifies an inpainting object based on the edit command. In some cases, the operations of this step refer to, or may be performed by, a PCG network as described with reference to FIGS. 5 and 6.

At operation 1115, the system generates attention weights based on the edit command in the inpainting object. In some cases, the operations of this step refer to, or may be performed by, a PCG network as described with reference to FIGS. 5 and 6.

At operation 1120, the system generates the inpainting mask based on the image features and the attention weights. In some cases, the operations of this step refer to, or may be performed by, a PCG network as described with reference to FIGS. 5 and 6.

Figure 12:
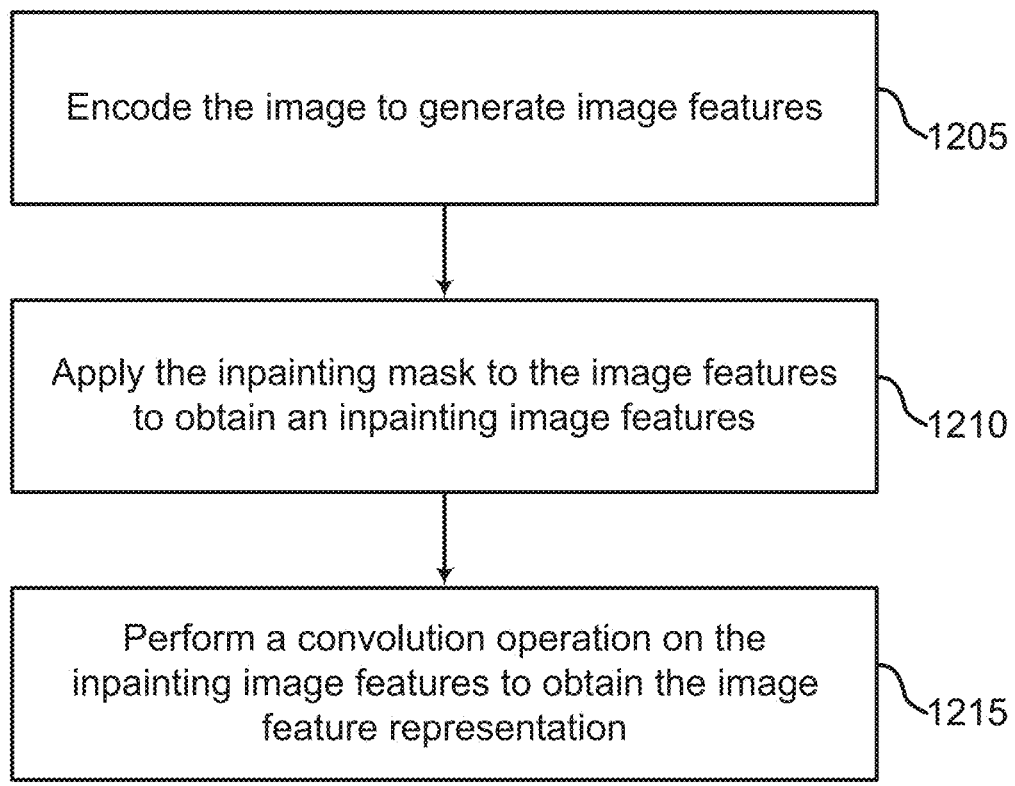
FIG. 12 shows an example of generating an image feature representation according to aspects of the present disclosure.

FIG. 12 shows an example of a method for generating an image feature representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system encodes the image to generate image features. In some cases, the operations of this step refer to, or may be performed by, an image encoder as described with reference to FIGS. 5 and 6.

At operation 1210, the system applies the inpainting mask to the image features to obtain an inpainting image features. In some cases, the operations of this step refer to, or may be performed by, an image encoder as described with reference to FIGS. 5 and 6.

At operation 1215, the system performs a convolution operation on the inpainting image features to obtain the image feature representation. In some cases, the operations of this step refer to, or may be performed by, an image encoder as described with reference to FIGS. 5 and 6.

Figure 13:
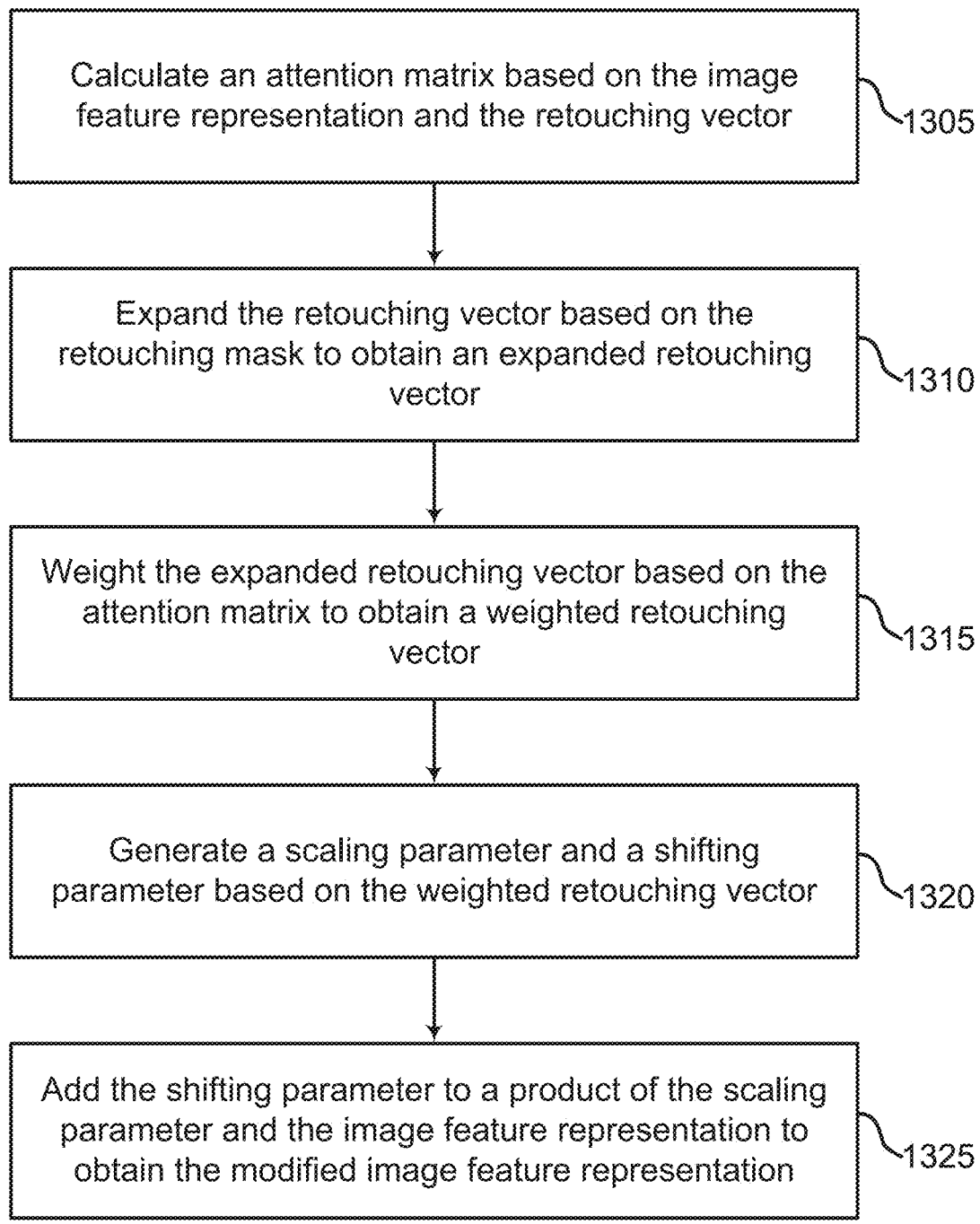
FIG. 13 shows an example of modifying an image feature representation according to aspects of the present disclosure.

FIG. 13 shows an example of a method for modifying an image feature representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system calculates an attention matrix based on the image feature representation and the retouching vector. In some cases, the operations of this step refer to, or may be performed by, a PRA network as described with reference to FIGS. 5-7.

At operation 1310, the system expands the retouching vector based on the retouching mask to obtain an expanded retouching vector. In some cases, the operations of this step refer to, or may be performed by, a PRA network as described with reference to FIGS. 5-7.

At operation 1315, the system weights the expanded retouching vector based on the attention matrix to obtain a weighted retouching vector. In some cases, the operations of this step refer to, or may be performed by, a PRA network as described with reference to FIGS. 5-7.

At operation 1320, the system generates a scaling parameter and a shifting parameter based on the weighted retouching vector. In some cases, the operations of this step refer to, or may be performed by, a multi-modal modulation network as described with reference to FIGS. 5-7.

At operation 1325, the system adds the shifting parameter to a product of the scaling parameter and the image feature representation to obtain the modified image feature representation. In some cases, the operations of this step refer to, or may be performed by, a multi-modal modulation network as described with reference to FIGS. 5-7.

At operation 1330, the system generates a modified image based on the modified image feature representation, where the modified image represents an application of the edit command to the image. In some cases, the operations of this step refer to, or may be performed by, a decoder as described with reference to FIGS. 5 and 6.

Training and Evaluation

Example methods for training a neural network for image processing are described with reference to FIGS. 14 and 15. One or more aspects of the method include receiving training data comprising a training image, an edit command, and a ground truth image representing an application of the edit command to the training image; encoding the edit command to obtain an inpainting vector and a retouching vector; generating an inpainting mask based on the inpainting vector and a retouching mask based on the retouching vector; generating an image feature representation based on the training image and the inpainting mask; generating a modified image feature representation based on the image feature representation, the retouching mask, and an attention matrix calculated using the retouching vector; generating a modified image based on the modified image feature representation, wherein the modified image represents an application of the edit command to the training image; calculating a loss function based on the modified image and the ground truth image; and training a neural network based on the loss function.

Some examples of the method, apparatus, non-transitory computer readable medium, and system further include computing an unconditional adversarial loss using a discriminator network based on the modified image and the ground truth image. Some examples further include training the neural network based on the unconditional adversarial loss. In some aspects, the loss function comprises an L1 loss.

Figure 14:
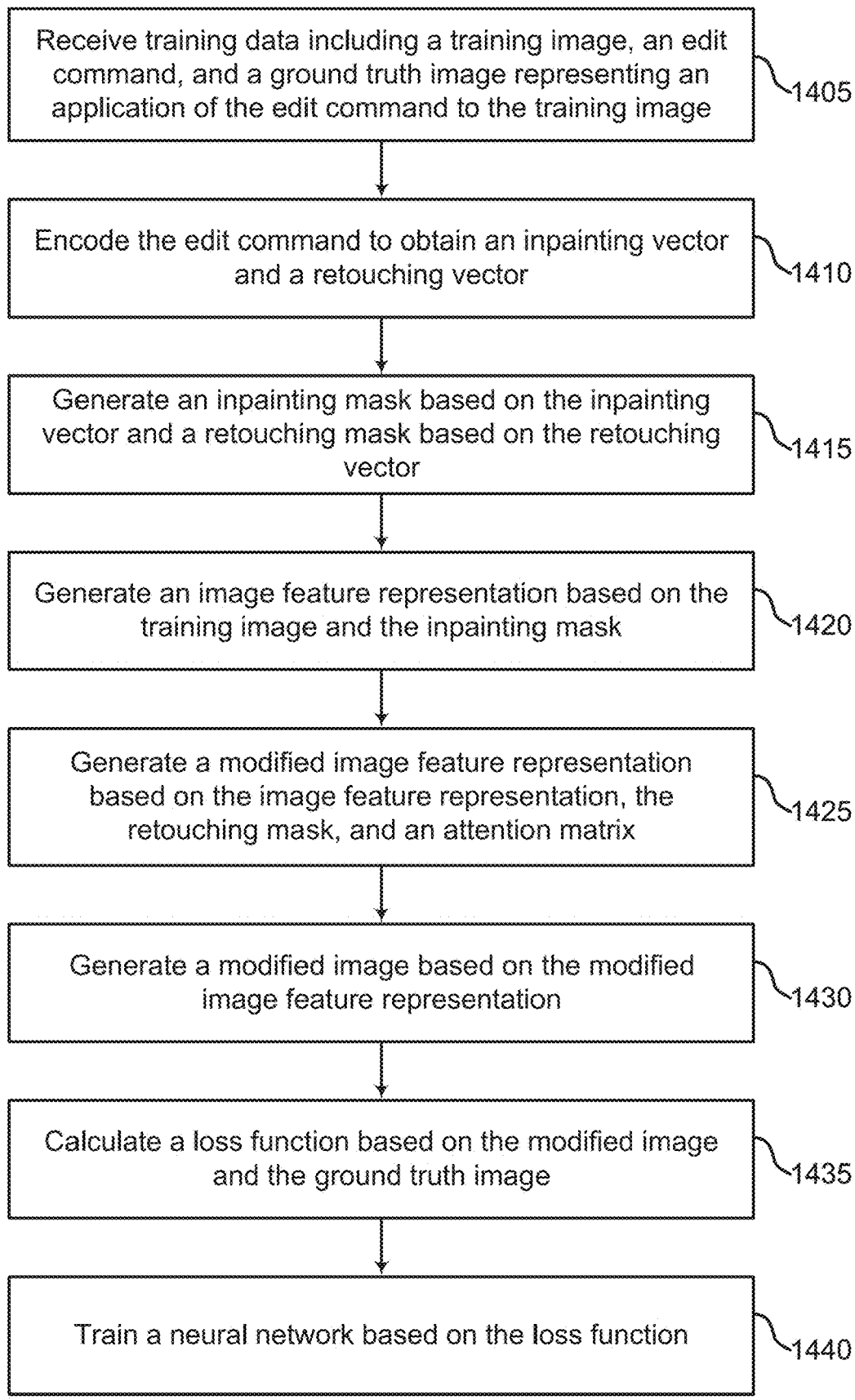
FIG. 14 shows an example of training a machine learning model according to aspects of the present disclosure.

FIG. 14 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In the example of FIG. 14, a neural network is trained based on a loss function. The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 1405, the system receives training data including a training image, an edit command, and a ground truth image representing an application of the edit command to the training image. In some cases, the operations of this step refer to, or may be performed by, a training component as described with reference to FIG. 5.

At operation 1410, the system encodes the edit command to obtain an inpainting vector and a retouching vector using an encoder of the image editing apparatus. At operation 1415, the system generates an inpainting mask based on the inpainting vector and a retouching mask based on the retouching vector. In some cases, the operations of this step refer to, or may be performed by, a PCG network as described with reference to FIGS. 5 and 6.

At operation 1420, the system generates an image feature representation based on the training image and the inpainting mask. In some cases, the operations of this step refer to, or may be performed by, an image encoder as described with reference to FIGS. 5 and 6.

At operation 1425, the system generates a modified image feature representation based on the image feature representation, the retouching mask, and an attention matrix calculated using the retouching vector. In some cases, the operations of this step refer to, or may be performed by, a multi-modal modulation network as described with reference to FIGS. 5-7.

At operation 1430, the system generates a modified image based on the modified image feature representation, where the modified image represents an application of the edit command to the training image. In some cases, the operations of this step refer to, or may be performed by, a decoder as described with reference to FIGS. 5 and 6.

At operation 1435, the system calculates a loss function based on the modified image and the ground truth image. In some cases, the operations of this step refer to, or may be performed by, a training component as described with reference to FIG. 5.

At operation 1440, the system trains a neural network based on the loss function. In some cases, the operations of this step refer to, or may be performed by, a training component as described with reference to FIG. 5.

In some cases, an L1 loss and an adversarial loss are used for the network. The L1 loss is applied between the output image of an image editing tool, x̃, and the target image, y, to drive the output image to be similar to the target image:

$$L_G^{L1} = |\tilde{x} - y| \tag{11}$$

The unconditional adversarial loss is utilized which can be formulated as:

$$L_G^{adv} = -\mathbb{E}_{\tilde{x} \sim \mathcal{P}_{model}}[\log D(\tilde{x})]$$

$$L_D^{adv} = \mathbb{E}_{y \sim \mathcal{P}_{data}}[\log D(y)] - \mathbb{E}_{\tilde{x} \sim \mathcal{P}_{model}}[1 - \log D(\tilde{x})] \tag{12}$$

The final objective functions for generator G and discriminator D are:

$$L_G = \lambda_G^{adv} L_G^{adv} + \lambda_G^{L1} L_G^{L1}$$

$$L_D = \lambda_D^{adv} L_D^{adv} \tag{13}$$

where $\lambda_G^{adv}$, $\lambda_G^{L1}$ and $\lambda_D^{adv}$ are the weights to balance the multiple objectives.

Conventional metrics used for evaluating photo editing are L1 distance and user studies. However, the quantitative metric L1 distance may not be able to reflect the quality of editing due to one target image for each input-request pair, whereas the editing results may be diverse while matching the request. A baseline that does not edit the images may be used. The baseline reflects that L1 distance may not be suitable as a metric. Similarly, metrics used in text-to-image or image manipulation, for example, manipulative precision (MP), are not appropriate since the language information describes an editing request, i.e., does not summarize the attributes of the target image.

Figure 15:
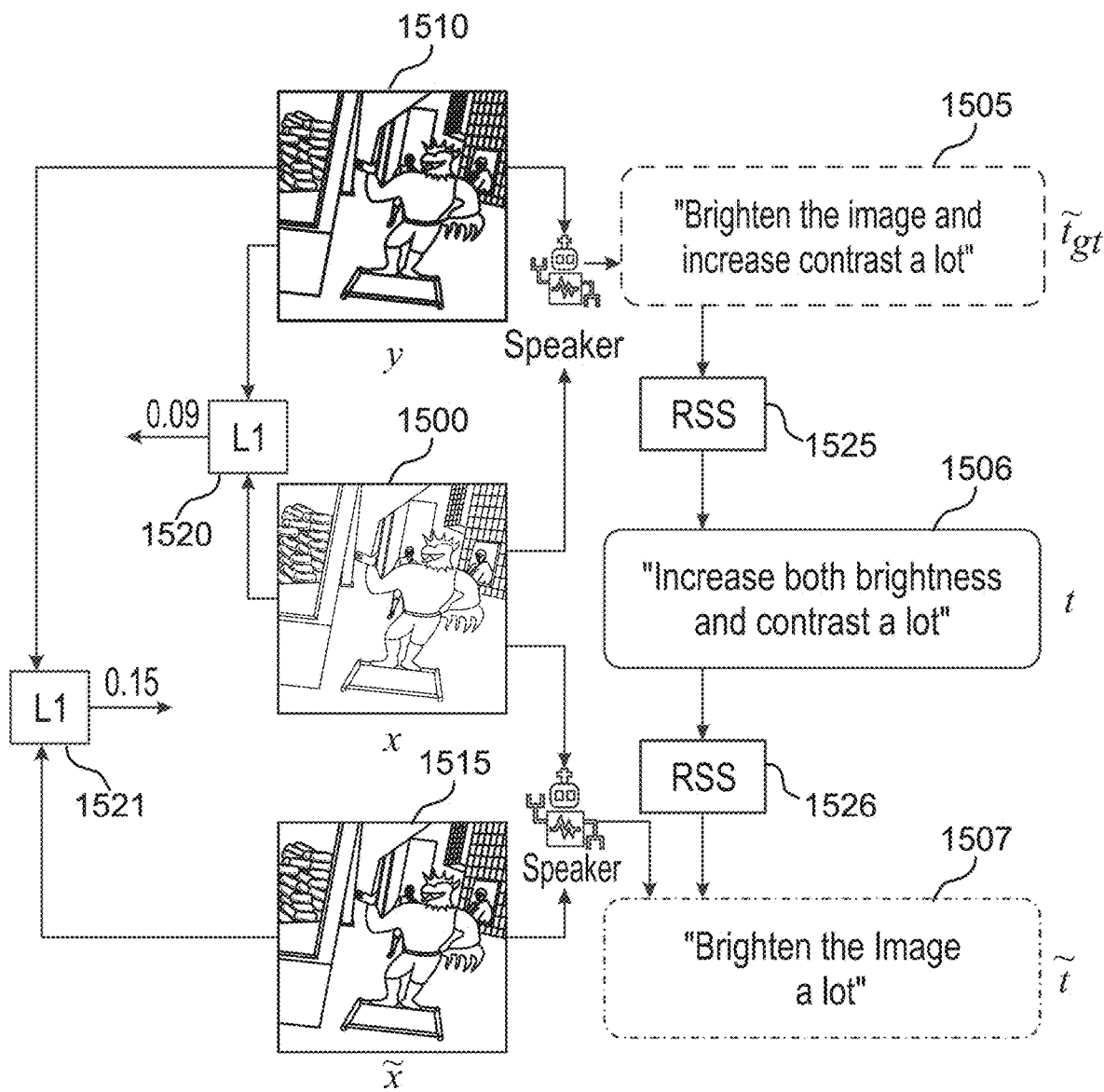
FIG. 15 shows an example of a diagram of a training method according to aspects of the present disclosure.

FIG. 15 shows an example of a diagram of a training method according to aspects of the present disclosure. The example shown includes input image 1500, edit request 1505 (i.e., $\tilde{t}_{gt}$, t, and $\tilde{t}$), target image 1510, synthesized image 1515, loss functions 1520, and evaluation metrics 1525. In some examples, a loss function 1520 is computed between the original input image 1500 and the target image 1510. Then, a synthesized image 1515 can be generated based on the input image 1500, and compared with the target image 1510 using the loss function 1520.

In some cases, an automated difference detector (or difference detector) can also compare the images to generate text that represents the difference between the images. An evaluation metric called redescription similarity score (RSS) can be used to facilitate training. The RSS may be calculated by using the trained difference-speaker. The trained speaker generates the edit request $\tilde{t}$ given the input image 1500 denoted as x and the synthesized image 1515 denoted as x. Next, RSS is calculated by evaluating the similarity between the generated request (i.e., edit request $\tilde{t}$ 1505) and the ground truth request (i.e., edit request t 1505). Thus, the edit request $\tilde{t}_{gt}$ 1505 can be generated automatically based on the difference between the input image 1500 and the target image 1510. This can be compared to the edit request t 1505. The edit request $\tilde{t}$ 1505 can be generated based on the difference between the synthesized image 1515 and the input image 1500.

The RSS includes translation metrics (e.g., BLEU-4, CIDEr, METEOR, ROUGE-L) which are used to evaluate similarity between sentences. A high value of RSS indicates that generated requests are similar to ground truth requests. The maximum value of RSS is obtained by using the input image 1500 and the target image 1510 to generate the edit request $\tilde{t}_{gt}$ 1505 and compare the edit request t 1505, which serves as the upper bound of RSS.

In some cases, a grounded image editing request (GIER) dataset and a request-augmented dataset is used. For example, GIER dataset consists of 30,000 samples, where each sample is a triplet that includes a source image, a linguistic, a target image, and a list of applied operations. In some examples, a request-augmented dataset, MIT-Adobe FiveK dataset, consists of 25,000 samples, where each sample is an input-target image pair. The request-augmented dataset is used for image retouching and does not include language annotations. An annotating procedure is followed to collect the linguistic request for each input-target image pair to form the request-augmented dataset (i.e., MIT-Adobe FiveK Aug dataset).

In one implementation, images are resized to 256×256. For example, an encoder-bottleneck-decoder structure that consists of two down-sample blocks, three bottleneck blocks, and two up-sample blocks in an image editing tool is adopted. The multi-modal modulation network is adopted in the first bottleneck since the features in the early layer maintain the semantic structure of the image.

An example embodiment of the present disclosure can be compared to baseline approaches such as Pix2pixAug, OMN, GeNeVA, TAGAN, SISGAN. Pix2pixAug is a GAN-based model following the language-augmented pix2pix model that uses predefined operations for image retouching. OMN is the operation modular network that comprises submodules of the predefined global operations. The parameters of each operation are predicted by the modular network. OMN depends on the annotations of operations. In some cases, a GeNeVA approach is used that learns to generate the image step-by-step according to the text description and use the approach for a single-step generation. TAGAN and SISGAN are approaches for text-guided image manipulation. w.o. PRA indicates use of an image editing tool without using PRA such that the locations receive the same modulation parameters. Mani-GAN depends on the attention between attributes of target images and words in text descriptions. The text features after composition are used in the decoder for generating outputs. The L1 loss is added for the baseline models which are trained on unpaired data.

In some cases, quantitative comparisons are performed with the baselines using redescription similarity score (RSS) on a grounded image editing request (GIER) dataset and a request-augmented dataset (i.e., FiveK dataset). The RSS score is calculated for the input image x 1500 and ground truth target image 1510. For example, linguistic requests in the FiveK dataset are simple and consist of retouching operations. User studies are conducted for evaluating the image editing method and baselines. In some examples, for given images generated by different methods, users are asked to rank the images by considering realistic images and images that match the linguistic request. Multiple images (e.g., 100 images) are generated for each method and volunteers are invited as testers to rank the generated images.

The effectiveness of the PRA may be seen using the value of RSS. Additionally, an image editing tool without PRA still has an increased performance compared to conventional image editing systems, which further suggests the effectiveness of the multi-modal modulation network. An image editing tool of the present disclosure outperforms baselines which use predefined operations by embedding the linguistic request as modulation parameters. In some cases, the multi-modal modulation network can handle requests which may not be represented by predefined operations.

Embodiments of the present disclosure outperform the baseline models considering the value of RSS and user studies. Additionally, the ranking of user studies is similar to the ranking of RSS, which indicates that the evaluation metric may reflect user opinion. An example embodiment of the disclosure includes qualitative comparison with baselines on the GIER dataset and request-augmented (i.e., FiveK) dataset.

In some cases, when the input images include abnormal illumination conditions (i.e., images are overexposed or underexposed), the corresponding edited image has abnormal illumination without using PRA since the brightness of the originally bright areas in the image is increased. Use of PRA results in natural illumination conditions, which are clear and match the user requests since the PRA learns to appropriately decide the degree of editing in each location. The spatial-adaptive editing provides for high brightening of dark areas and low brightening of originally bright areas. Alternate methods that rely on predefined operations may not be able to adapt to the requests that are not represented by predefined operations. By contrast, embodiments of the present disclosure directly embed the requests into the conditional signal for GAN, which provides for unconstrained linguistic requests.

Embodiments of the present disclosure include an image editing tool that outperforms image editing methods in a GIER and FiveK dataset. The linguistic requests in a GIER dataset consist of inpainting and retouching. The retouching results that are adaptively edited by the image editing tool are clear and match the requests. However, baseline methods fail to work on images with abnormal illumination conditions (i.e., overexposed or underexposed) and difficult requests (removing an object or changing tone of the image). By contrast, embodiments of the present disclosure correctly localize and remove an undesired object from the image.

Similarly, embodiments of the present disclosure outperform baseline models on the FiveK dataset that includes editing requests in the form of simple retouching operations. Therefore, the results generated by these embodiments are clear and match user requests.

Accordingly, the present disclosure describes a photo editing apparatus that takes an image and a linguistic request as input and outputs the edited image that matches the linguistic request. A multi-modal modulation network directly embeds the request into modulation parameters as the conditional input signal which enables the unconstrained requests. Additionally, the model does not use predefined operations. A PRA assigns an appropriate editing degree for each location to produce reasonable and spatial-adaptive results when the requests are vague.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one".

What is claimed is:

1. A method of image processing, comprising:
identifying an image and an edit command for the image;
encoding the edit command to obtain an inpainting vector and a retouching vector, wherein the inpainting vector indicates a local edit of the image and the retouching vector indicates a global edit of the image;
generating an inpainting mask based on the inpainting vector and a retouching mask based on the retouching vector;
generating an image feature representation based on the image and the inpainting mask;
generating a modified image feature representation based on the image feature representation, the retouching mask, and an attention matrix calculated using the retouching vector; and
generating a modified image based on the modified image feature representation, wherein the modified image represents an application of the edit command to the image.

2. The method of claim 1, further comprising:
receiving the edit command from a user via an audio input device; and
transcribing the edit command, wherein the encoding is based on the transcribed edit command.

3. The method of claim 1, further comprising:
generating a word embedding for each of a plurality of words of the edit command;
generating a probability vector that includes an inpainting probability and a retouching probability for each of the plurality of words;
applying the inpainting probability to a corresponding word of the plurality of words to obtain an inpainting weighted word representation, wherein the inpainting vector includes the inpainting weighted word representation; and
applying the retouching probability to the corresponding word of the plurality of words to obtain a retouching weighted word representation, wherein the retouching vector includes the retouching weighted word representation.

4. The method of claim 1, further comprising:
encoding the image to generate image features;
identifying an inpainting object based on the edit command;
generating attention weights based on the edit command in the inpainting object; and
generating the inpainting mask based on the image features and the attention weights.

5. The method of claim 1, further comprising:
determining whether the retouching vector indicates the global edit; and
generating the retouching mask based on the determination.

6. The method of claim 1, further comprising:
encoding the image to generate image features;
applying the inpainting mask to the image features to obtain an inpainting image features; and
performing a convolution operation on the inpainting image features to obtain the image feature representation.

7. The method of claim 1, further comprising:
calculating the attention matrix based on the image feature representation and the retouching vector;
expanding the retouching vector based on the retouching mask to obtain an expanded retouching vector; and
weighting the expanded retouching vector based on the attention matrix to obtain a weighted retouching vector.

8. The method of claim 7, further comprising:
generating a scaling parameter and a shifting parameter based on the weighted retouching vector; and
adding the shifting parameter to a product of the scaling parameter and the image feature representation to obtain the modified image feature representation.

9. The method of claim 1, further comprising:
performing a convolution operation on the modified image feature representation to obtain the modified image.

10. The method of claim 1, wherein:
the inpainting vector indicates a local edit of the image.

11. The method of claim 1, wherein:
the retouching vector indicates a global edit of the image.

12. A method of training a neural network for image processing, comprising:
receiving training data comprising a training image, an edit command, and a ground truth image representing an application of the edit command to the training image;
encoding the edit command to obtain an inpainting vector and a retouching vector wherein the inpainting vector indicates a local edit of the training image and the retouching vector indicates a global edit of the training image;
generating an inpainting mask based on the inpainting vector and a retouching mask based on the retouching vector;
generating an image feature representation based on the training image and the inpainting mask;
generating a modified image feature representation based on the image feature representation, the retouching mask, and an attention matrix calculated using the retouching vector; and
generating a modified image based on the modified image feature representation, wherein the modified image represents the application of the edit command to the training image;
calculating a loss function based on the modified image and the ground truth image; and
training the neural network based on the loss function.

13. The method of claim 12, further comprising:

computing an unconditional adversarial loss using a discriminator network based on the modified image and the ground truth image; and training the neural network based on the unconditional adversarial loss.

14. The method of claim 12, wherein:

the loss function comprises an L1 loss.

15. An apparatus for image processing, comprising:

an encoder configured to encode an edit command for an image to obtain an inpainting vector and a retouching vector, wherein the inpainting vector indicates a local edit of the image and the retouching vector indicates a global edit of the image;

a phrase conditioned grounding (PCG) network configured to generate an inpainting mask based on the inpainting vector and a retouching mask based on the retouching vector;

a convolutional network configured to generate an image feature representation based on the image and the inpainting mask;

a multi-modal modulation network configured to generate a modified image feature representation based on the image feature representation, the retouching mask, and an attention matrix calculated using the retouching vector; and a decoder configured to generate a modified image based on the modified image feature representation, wherein the modified image represents an application of the edit command to the image.

16. The apparatus of claim 15, further comprising:

a photo request attention (PRA) network configured to calculate the attention matrix based on the image feature representation and the retouching vector.

17. The apparatus of claim 16, wherein:

the PRA network comprises an embedding network configured to embed the image feature representation and the retouching vector into a common embedding space.

18. The apparatus of claim 15, further comprising:

an audio input device configured to receive the edit command from a user, and to transcribe the edit command, wherein the encoding is based on the transcribed edit command.

19. The apparatus of claim 15, wherein:

the encoder comprises a Bi-LSTM.

20. The apparatus of claim 15, wherein:

the convolutional network comprises a gated convolution layer.

* * * * *